(12) United States Patent
Al Sakka et al.

(10) Patent No.: US 12,479,261 B2
(45) Date of Patent: Nov. 25, 2025

(54) VEHICLE SUSPENSION SYSTEM WITH PASSIVE AND ACTIVE ROLL CONTROL

(71) Applicant: Advanced Suspension Technology LLC, Northville, MI (US)

(72) Inventors: Monzer Al Sakka, Sint-Truiden (BE); Miguel Dhaens, Lommel (BE)

(73) Assignee: Advanced Suspension Technology LLC, Northville, MI (US)

( * ) Notice: Subject to any disclaimer, the term of this patent is extended or adjusted under 35 U.S.C. 154(b) by 0 days.

(21) Appl. No.: 18/958,462

(22) Filed: Nov. 25, 2024

(65) Prior Publication Data

US 2025/0083488 A1 Mar. 13, 2025

Related U.S. Application Data

(62) Division of application No. 18/197,382, filed on May 15, 2023, now Pat. No. 12,179,541.

(51) Int. Cl.
*B60G 17/08* (2006.01)
*B60G 13/08* (2006.01)

(52) U.S. Cl.
CPC ............ *B60G 17/08* (2013.01); *B60G 13/08* (2013.01); *B60G 2202/24* (2013.01);
(Continued)

(58) Field of Classification Search
CPC ...... B60G 17/056; B60G 17/08; B60G 13/08; B60G 2204/24; B60G 2204/82; B60G 2800/164

See application file for complete search history.

(56) References Cited

U.S. PATENT DOCUMENTS 5,562,305 A 10/1996 Heyring
5,919,240 A 7/1999 Ney et al.
(Continued)

FOREIGN PATENT DOCUMENTS

CN 103807344 A 5/2014
CN 204037280 U 12/2014
(Continued)

OTHER PUBLICATIONS

International Search Report and Written Opinion of the ISA issued in PCT/US2024/028588, mailed Jul. 25, 2024; ISA/US.
(Continued)

*Primary Examiner* — James A English
(74) *Attorney, Agent, or Firm* — Harness, Dickey & Pierce, P.L.C.

(57) ABSTRACT

A suspension system including four dampers each having a compression chamber and a rebound chamber. First and second hydraulic circuits interconnect the compression and rebound chambers of the front dampers, while third and fourth hydraulic circuits interconnect the compression and rebound chambers of the back dampers. A first longitudinal hydraulic line extends between and connects the first and third hydraulic circuits and a second longitudinal hydraulic line extends between and connects the second and fourth hydraulic circuits. A single bi-directional pump is connected in-line with a fluid distribution line that extends between and connects the first and second longitudinal hydraulic lines a can pump fluid in opposite directions through the fluid distribution line to provide active roll stiffness.

4 Claims, 18 Drawing Sheets

(52) U.S. Cl.
  CPC .. *B60G 2202/416* (2013.01); *B60G 2500/114* (2013.01); *B60G 2800/0122* (2013.01); *B60G 2800/014* (2013.01)

(56) References Cited

U.S. PATENT DOCUMENTS

| | | | |
|---|---|---|---|
| 6,010,139 | A | 1/2000 | Heyring et al. |
| 6,519,517 | B1 | 2/2003 | Heyring et al. |
| 7,240,906 | B2 | 7/2007 | Klees |
| 7,472,914 | B2 | 1/2009 | Anderson et al. |
| 7,686,309 | B2 | 3/2010 | Munday et al. |
| 8,123,235 | B2 | 2/2012 | Monk et al. |
| 8,695,768 | B2 | 4/2014 | Kiriyama |
| 9,080,631 | B2 | 7/2015 | Hoult |
| 10,315,736 | B2 | 6/2019 | Monk |
| 11,220,152 | B2 | 1/2022 | Witte |
| 12,083,848 | B1 | 9/2024 | Dhaens et al. |
| 2004/0113377 | A1 | 6/2004 | Klees |
| 2006/0151969 | A1 | 7/2006 | Revill et al. |
| 2009/0140501 | A1 | 6/2009 | Taylor et al. |
| 2012/0305347 | A1* | 12/2012 | Mori ............... B60G 17/08 188/266.2 |
| 2018/0345747 | A1 | 12/2018 | Boon et al. |
| 2019/0225044 | A1 | 7/2019 | Witte |
| 2021/0197640 | A1 | 7/2021 | Yamashita |
| 2022/0144035 | A1 | 5/2022 | Al Sakka et al. |
| 2022/0380004 | A1 | 12/2022 | Walker et al. |
| 2023/0113777 | A1 | 4/2023 | Vandersmissen et al. |
| 2023/0113819 | A1 | 4/2023 | Vandersmissen et al. |
| 2023/0114717 | A1 | 4/2023 | Boon et al. |
| 2023/0115594 | A1 | 4/2023 | Calchand et al. |
| 2023/0278387 | A1 | 9/2023 | Birch et al. |

FOREIGN PATENT DOCUMENTS

| | | | | |
|---|---|---|---|---|
| CN | 204037282 | U | 12/2014 | |
| CN | 207059676 | U | 3/2018 | |
| CN | 207902078 | U | 9/2018 | |
| CN | 214057159 | U | 8/2021 | |
| CN | 113382921 | B | 3/2024 | |
| DE | 102013021589 | A1 * | 6/2015 | ............. F16F 9/46 |
| DE | 102020001633 | A1 | 10/2020 | |
| WO | WO-2006092012 | A1 | 9/2006 | |
| WO | WO-2007098559 | A1 | 9/2007 | |
| WO | WO-2018226588 | A1 | 12/2018 | |
| WO | WO-2020113287 | A1 | 6/2020 | |
| WO | WO-2020214666 | A1 | 10/2020 | |

OTHER PUBLICATIONS

International Search Report and Written Opinion of the ISA issued in PCT/US2024/028578, mailed Aug. 5, 2024; ISA/US.
International Search Report and Written Opinion of the ISA issued in PCT/US2024/028568, mailed Aug. 5, 2024; ISA/US.

* cited by examiner

VEHICLE SUSPENSION SYSTEM WITH PASSIVE AND ACTIVE ROLL CONTROL

CROSS-REFERENCE TO RELATED APPLICATIONS

The present disclosure is a divisional of U.S. patent application Ser. No. 18/197,382 filed on May 15, 2023. The entire disclosure of the application referenced above is incorporated herein by reference.

FIELD

The present disclosure relates generally to suspension systems for motor vehicles and more particularly to suspension systems that resist pitch and roll movements of a vehicle.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean right or left during corning (e.g., in turns), pitch forward under deceleration (e.g., under braking), and pitch back under acceleration. The lateral acceleration the vehicle experiences in turns causes a roll moment where the vehicle will lean/roll to the right when turning left and to the left when turning right. The fore and aft acceleration the vehicle experiences under acceleration and braking causes a pitch moment where the vehicle will lean/dive forward, loading the front axle during braking, and lean/squat rearward (aft), loading the rear axle, under acceleration. These roll and pitch moments decrease grip, cornering performance, and braking performance and can also be uncomfortable to the driver and passengers. Many vehicles are equipped with stabilizer bars/anti-roll bars, which are mechanical systems that help counteract the roll moments experienced during driving. For example, anti-roll bars are typically mechanical linkages that extend laterally across the width of the vehicle between the right and left dampers. When one of the dampers extends, the anti-roll bar applies a force to the opposite damper that counteracts the roll moment of the vehicle and helps to correct the roll angle to provide flatter cornering. However, there are several drawbacks associated with these mechanical systems. First, there are often packaging constraints associated with mechanical systems because a stabilizer bar/anti-roll bar requires a relatively straight, unobstructed path across the vehicle between the dampers. Second, stabilizer bars/anti-roll bars are reactive and work when the suspension starts moving (i.e. leaning) and therefore are not pro-active to stop roll before it begins. Such mechanical systems also cannot be easily switched off or cancelled out when roll stiffness is not needed. Some vehicles do have stabilizer bar/anti-roll bar disconnects that may be manually or electronically actuated, but the complexity and cost associated with these systems make them ill-suited for most vehicle applications. In addition, typical stabilizer bars/anti-roll bars do not provide additional pitch stiffness or pitch control.

In an effort to augment or replace traditional mechanical stabilizer bars/anti-roll bars, anti-roll suspension systems are being developed that hydraulically connect two or more dampers in a hydraulic circuit where the extension of one damper produces a pressure change in the other damper(s) in the hydraulic circuit that makes it more difficult to compress the other damper(s) in the hydraulic circuit. This pressure change in the other damper(s) increases the roll stiffness of the suspension system of the vehicle. However, the downside of such systems is that ride comfort is more difficult to achieve because bump forces can be transmitted from one damper to another damper across the hydraulic circuit resulting in unwanted suspension movement. Accordingly, there remains a need for improved vehicle suspension systems that can minimize roll, pitch, and other unwanted suspension movements while maintaining acceptable levels of ride comfort.

SUMMARY

This section provides a general summary of the disclosure, and is not a comprehensive disclosure of its full scope or all of its features.

In accordance with one aspect of the subject disclosure, a suspension system is provided that includes four dampers: a front left damper, a front right damper, a back left damper, and a back right damper. The front left damper includes a first compression chamber and a first rebound chamber. The front right damper includes a second compression chamber and a second rebound chamber. The back left damper includes a third compression chamber and a third rebound chamber. The back right damper includes a fourth compression chamber and a fourth rebound chamber.

The suspension system of the present disclosure also includes four hydraulic circuits: a first hydraulic circuit connects the first compression chamber of the front left damper in fluid communication with the second rebound chamber of the front right damper, a second hydraulic circuit connects the first rebound chamber of the front left damper in fluid communication with the second compression chamber of the front right damper, a third hydraulic circuit connects the third compression chamber of the back left damper in fluid communication with the fourth rebound chamber of the back right damper, and a fourth hydraulic circuit connects the third rebound chamber of the back right damper in fluid communication with the fourth compression chamber of the back right damper. The suspension system also has a first longitudinal hydraulic line that extends between and fluidly connects the first and third hydraulic circuits, a second longitudinal hydraulic line that extends between and fluidly connects the second and fourth hydraulic circuits, and a fluid distribution line that extends between and fluidly connects the first longitudinal hydraulic line and the second longitudinal hydraulic line.

The suspension system of the present disclosure further comprises a first bi-directional pump that is arranged along and connected in fluid communication with the fluid distribution line. The first bi-directional pump has a first operating mode for pumping hydraulic fluid in a first direction through the fluid distribution line to the second longitudinal hydraulic line and a second operating mode for pumping hydraulic fluid in a second direction through the fluid distribution line to the first longitudinal hydraulic line. Passive roll stiffness is therefore provided when the first bi-directional pump is deactivated and active roll stiffness can be provided when running the first bi-directional pump in the first an second operating modes.

In accordance with another aspect of the present disclosure, the suspension system further comprises a controller that is electrically connected to the first bi-directional pump. The controller is programmed to activate and deactivate the first bi-directional pump and therefore initial different suspension operating modes (e.g., comfort operating modes, passive roll control operating modes, active roll control operating modes, and pressure control operating modes).

In accordance with another aspect of the present disclosure, the suspension system further comprises a second bi-directional pump that is arranged along and connected in fluid communication with the first longitudinal hydraulic line and a third bi-directional pump that is arranged along and connected in fluid communication with the second longitudinal hydraulic line. The second bi-directional pump has a third operating mode for pumping hydraulic fluid through the first longitudinal hydraulic line in a third direction from the third hydraulic circuit to the first hydraulic circuit and a fourth operating mode for pumping hydraulic fluid through the first longitudinal hydraulic line in a fourth direction from the first hydraulic circuit to the third hydraulic circuit. The third bi-directional pump has a fifth operating mode for pumping hydraulic fluid through the second longitudinal hydraulic line in a fifth direction from the fourth hydraulic circuit to the second hydraulic circuit and a sixth operating mode for pumping hydraulic fluid through the second longitudinal hydraulic line in a sixth direction from the second hydraulic circuit to the fourth hydraulic circuit. The controller controls the operation of the second and third bi-direction pumps to provide additional suspension operating modes (e.g., roll moment distribution control operating modes, pitch control operating modes, and warp control operating modes).

Advantageously, the suspension system of the present disclosure is able to reduce/eliminate vehicle pitch and roll movements for improved grip, performance, handling, and braking. The reduction of pitch and roll angles improves the comfort, steering feel, agility, and stability of the vehicle. Pitch and roll control is provided by increasing the pitch stiffness or roll stiffness of the suspension system based on the fluid pressure in the system. The level of pitch and roll stiffness can be adjusted by using the bi-directional pumps to change the pressure in select hydraulic circuits of the system. Valves in the hydraulic circuits can also be opened to decouple the dampers in situations where added pitch and/or roll stiffness is not desired or necessary.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
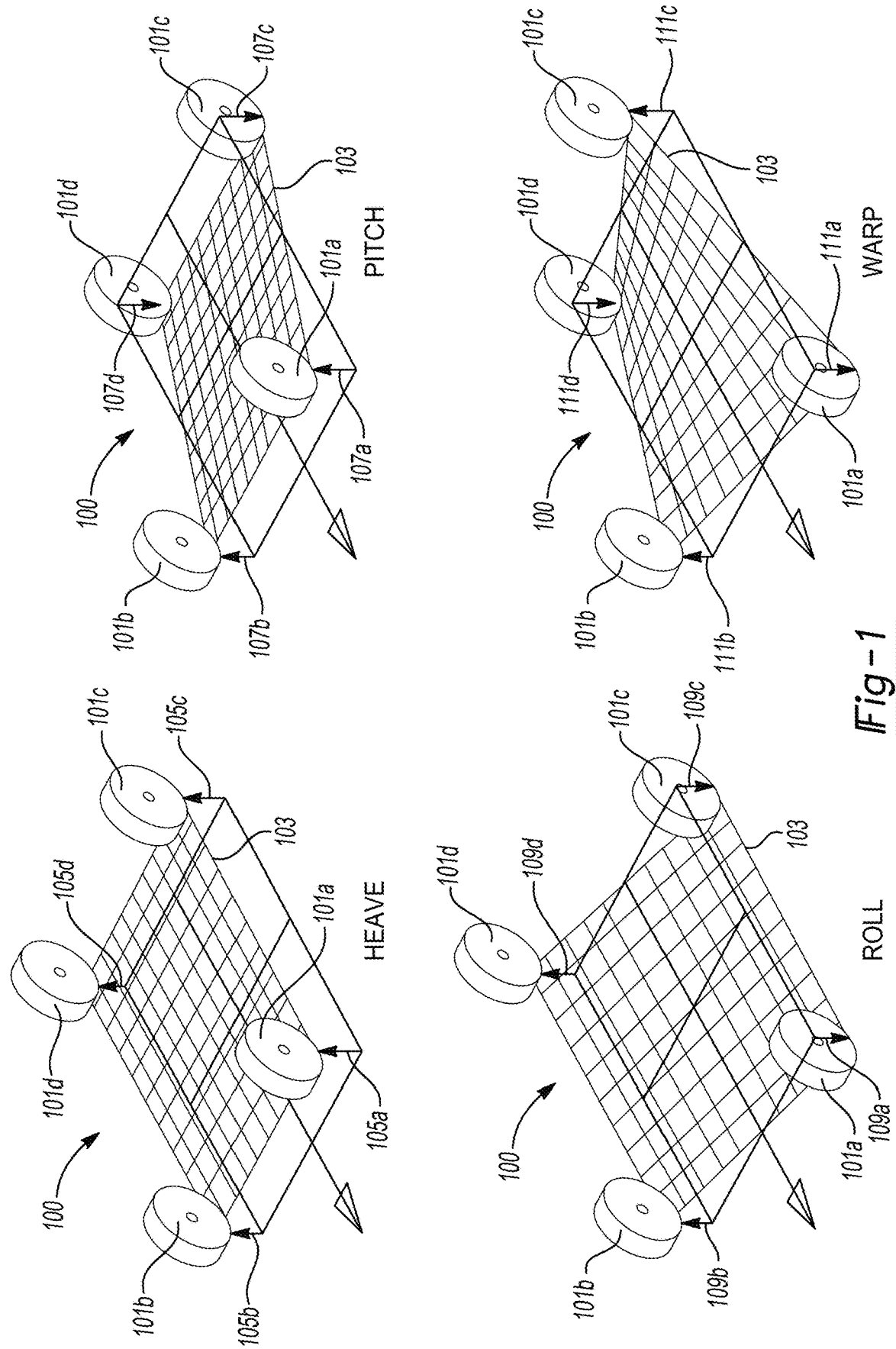
FIG. 1 is a schematic diagram illustrating an exemplary vehicle suspension system as it experiences suspension heave, pitch, roll, and warp.

Referring to the Figures, wherein like numerals indicate corresponding parts throughout the several views, various comfort valve equipped suspension systems are shown.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, the term "controller(s)" may be replaced with the term "electrical circuit(s)." For example, the term "controller(s)" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller(s) may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

With reference to FIG. 1, a suspension system 100 for a vehicle is illustrated. The vehicle includes a front left wheel 101a, a front right wheel 101b, a back left wheel 101c, and a back right wheel 101d. While it should be appreciated that the vehicle may include a different number of wheels than those shown in FIG. 1, in most automotive applications, four wheels are used at each corner of the vehicle body 103. As shown in FIG. 1, there are four different types of suspension movements that vehicles routinely experience—heave, pitch, roll, and warp. When the suspension system 100 of the vehicle experiences heave, the vehicle body 103 either lifts (as illustrated in FIG. 1), such as when the vehicle travels over a crest (i.e., hill), or drops, such as when the vehicle travels over a dip (i.e., valley) in the road, which results in either a downward movement (not shown) or upward movement 105a-105d (as shown) of all four wheels 101a-101d simultaneously or nearly simultaneously. When the suspension system 100 of the vehicle experiences pitch, either the front of the vehicle body 103 lifts and the rear of the vehicle body 103 drops, such as during hard acceleration, or the front of the vehicle body 103 drops and the rear of the vehicle body 103 lifts, such as during hard braking. In the example shown in FIG. 1 illustrating pitch, the front of the vehicle body 103 is lifting and the rear of the vehicle body 103 is dropping (i.e., pitching aft), the front wheels 101a, 101b experience upward movement 107a, 107b while the rear wheels 101c, 101d experience downward movement 107c, 107d. The opposite occurs when the front of the vehicle body 103 is dropping and the rear of the vehicle body 103 is lifting (i.e., pitching forward). When the suspension system 100 of the vehicle experiences roll, either the right side of the vehicle body 103 lifts and the left side of the vehicle body 103 drops, such as during a hard right turn, or the right side of the vehicle body 103 drops and the left side of the vehicle body 103 lifts, such as during a hard left turn. In the example shown in FIG. 1 illustrating roll, when the right side of the vehicle body 103 is lifting and the left side of the vehicle body 103 is dropping (i.e., rolling left), the right wheels 101b, 101d experience upward movement 109b, 109d while the left wheels 101a, 101c experience downward movement 109a, 109c. The opposite occurs when the right side of the vehicle body 103 is dropping and the left side of the vehicle body 103 is lifting (i.e., rolling right). When the suspension system 100 of the vehicle experiences warp, either the front right and back left wheels 101b, 101c experience lifting (i.e., upward) movement 111b, 111c while the front left and back right wheels 101a, 101d experience dropping (i.e., downward) movement 111a, 111d (as illustrated in FIG. 1) or the front right and back left wheels 101b, 101c drop while the front left and back right wheels 101a, 101d lift. As will be explained in greater detail below, the object of the suspension system 100 described herein is to reduce or eliminate these movements.

Figure 2:
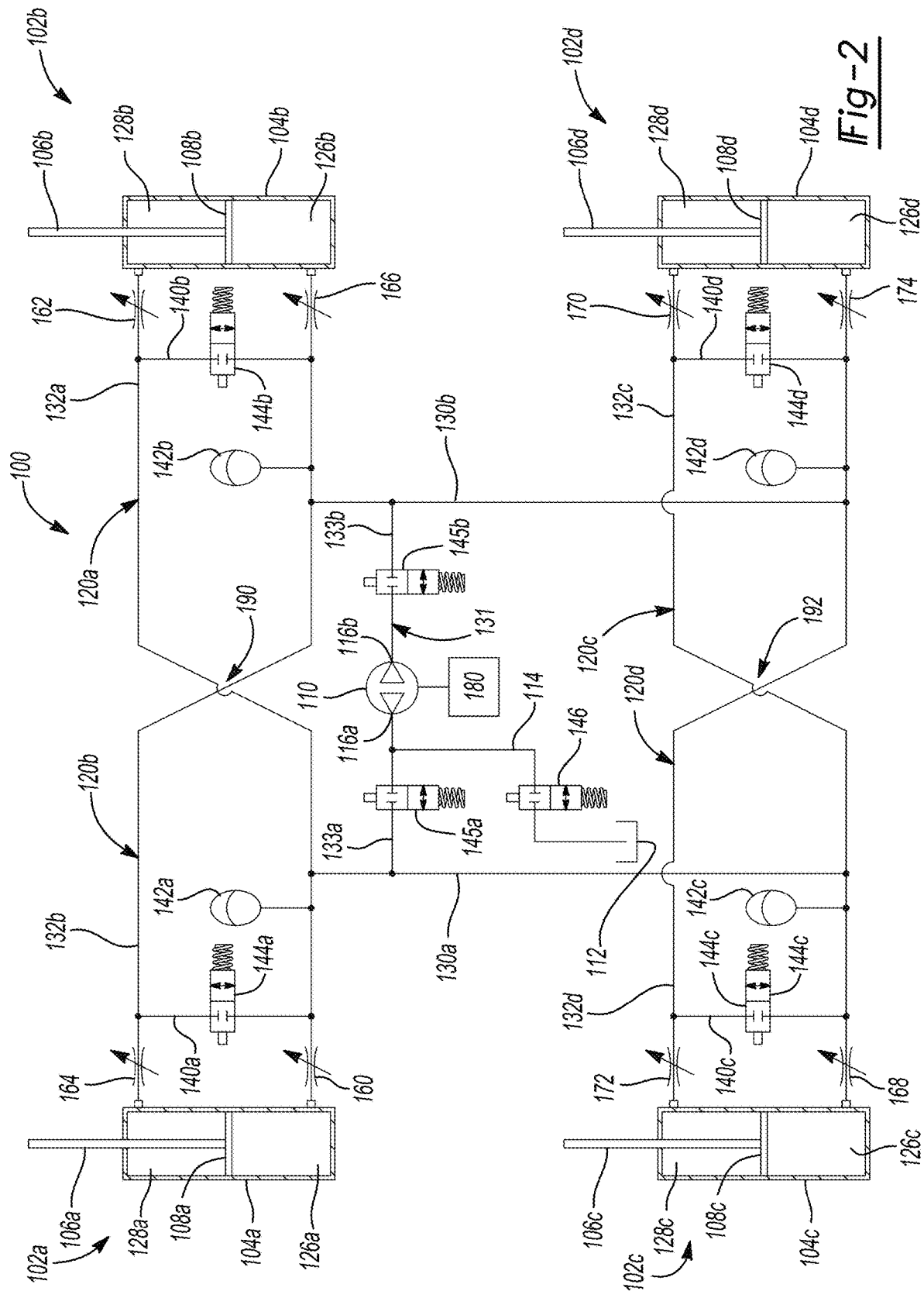
FIG. 2 is a schematic diagram illustrating an exemplary suspension system of the present disclosure that includes a centralized bi-directional pump.

With reference to FIG. 2, the suspension system 100 includes a front left damper 102a, a front right damper 102b, a back left damper 102c, and a back right damper 102d. While it should be appreciated that the suspension system 100 described herein may include a different number of dampers than those shown in the drawings, in most automotive applications, four dampers are used at each corner of a vehicle to control vertical movements of the front and rear wheels 101a-101d of the vehicle.

Each of the dampers 102a, 102b, 102c, 102d of the suspension system 100 includes a damper housing 104a, 104b, 104c, 104d, a piston rod 106a, 106b, 106c, 106d, and a piston 108a, 108b, 108c, 108d that is mounted on the piston rod 106a, 106b, 106c, 106d. The pistons 108a, 108b, 108c, 108d are closed pistons with no fluid flow paths defined within or by the piston structure. The pistons 108a, 108b, 108c, 108d are arranged in sliding engagement with and inside the damper housings 104a, 104b, 104c, 104d such that the pistons 108a, 108b, 108c, 108d divide each damper housing 104a, 104b, 104c, 104d into compression and rebound chambers. As such, the front left damper 102a includes a first compression chamber 126a and a first rebound chamber 128a, the front right damper 102b includes a second compression chamber 126b and a second rebound chamber 128b, the back left damper 102c includes a third compression chamber 126c and a third rebound chamber 1280, and the back right damper 102d includes a fourth compression chamber 126d and a fourth rebound chamber 128d. The rebound chambers 128a, 128b, 128c, 128d of the dampers 102a, 102b, 102c, 102d decrease in volume during rebound/extension strokes and increase in volume during compression strokes of the dampers 102a, 102b, 102c, 102d. The compression chambers 126a, 126b, 126c, 126d of the dampers 102a, 102b, 102c, 102d decrease in volume during compression strokes of the dampers 102a, 102b, 102c, 102d and increase in volume during rebound/extension strokes of the dampers 102a, 102b, 102c, 102d.

The first compression chamber 126a of the front left damper 102a is connected in fluid communication with the second rebound chamber 128b of the front right damper 102b via a first hydraulic circuit 120a. The first hydraulic circuit 120a includes a first hydraulic line 132a that extends between and fluidly connects the first compression chamber 126a of the front left damper 102a and the second rebound chamber 128b of the front right damper 102b. The first rebound chamber 128a of the front left damper 102a is connected in fluid communication with the second compression chamber 126b of the front right damper 102b via a second hydraulic circuit 120b. The second hydraulic circuit 120b includes a second hydraulic line 132b that extends between and fluidly connects the first rebound chamber 128a of the front left damper 102a and the second compression chamber 126b of the front right damper 102b. Thus, the first and second hydraulic lines 132a, 132b of the first and second hydraulic circuits 120a, 120b cross-over one another at a first cross-over point 190.

The third compression chamber 126c of the back left damper 102c is connected in fluid communication with the fourth rebound chamber 128d of the back right damper 102d via a third hydraulic circuit 120c. The third hydraulic circuit 120c includes a third hydraulic line 132c that extends between and fluidly connects third compression chamber 126c of the back left damper 102c and the fourth rebound chamber 128d of the back right damper 102d. The third rebound chamber 128c of the back left damper 102c is connected in fluid communication with the fourth compression chamber 126d of the back right damper 102d via a fourth hydraulic circuit 120d. The fourth hydraulic circuit 120d includes a fourth hydraulic line 132d that extends between and fluidly connects the third rebound chamber 128c of the back left damper 102c and the fourth compression chamber 126d of the back right damper 102d. Thus, the third and fourth hydraulic lines 132c, 132d of the third and fourth hydraulic circuits 120c, 120d cross-over one another at a second cross-over point 192.

The suspension system 100 includes a first longitudinal hydraulic line 130a that extends between and fluidly connects the first hydraulic circuit 120a and the third hydraulic circuit 120c, a second longitudinal hydraulic line 130b that extends between and fluidly connects the second hydraulic circuit 120b and the fourth hydraulic circuit 120d, and a fluid distribution line 131 that extends between and is fluidly connected to the first and second longitudinal hydraulic lines 130a, 130b. A bi-directional pump 110 is arranged along and connected in-line with the fluid distribution line 131 and divides the fluid distribution line 131 into a first distribution line segment 133a and a second distribution line segment 133b. The first distribution line segment 134a extends between and fluidly connects the first longitudinal hydraulic line 130a with a first port 116a on the bi-directional pump 110 and the second distribution line segment 133b extends between and fluidly connects the second longitudinal hydraulic line 130b with a second port 116b on the bi-directional pump 110.

The fluid distribution line 131 is connected to a hydraulic fluid reservoir 112 (e.g., a tank) by a reservoir line 114, which extends between and fluidly connects the hydraulic fluid reservoir 112 to the first distribution line segment 133a of the fluid distribution line 131 in the arrangement shown in FIGS. 2-7. However, it should be appreciated that the reservoir line 114 could alternatively extend between and fluidly connect the hydraulic fluid reservoir 112 and the second distribution line segment 133b. The bi-directional pump 110 can operate (i.e., pump fluid) in two opposing directions depending on the polarity of the electricity that is supplied to the bi-directional pump 110. Thus, the first port 116a of the bi-directional pump 110 may operate as either an inlet port or an outlet port depending on the direction the bi-directional pump 110 is operating in and the same is true for the second port 116b of the bi-directional pump 110. As a result, the bi-directional pump 110 can operate to pump hydraulic fluid from the first distribution line segment 133a of the fluid distribution line 131 and therefore from either the first longitudinal hydraulic line 130a or the reservoir line 114 and to the second distribution line segment 133b of the fluid distribution line 131 and therefore to the second longitudinal hydraulic line 130b. The bi-directional pump 110 can also operate in the opposite direction to pump hydraulic fluid from the second distribution line segment 133b of the fluid distribution line 131 and therefore from the second longitudinal hydraulic line 130b and to the first distribution line segment 133a of the fluid distribution line 131 and therefore to either the first longitudinal hydraulic line 130a or the reservoir line 114.

In the example where the first port 116a is operating as the inlet port of the bi-directional pump 110 and the second port 116b is operating as the outlet port of the bi-directional pump 110, the bi-directional pump 110 draws in hydraulic fluid from the first distribution line segment 133a via the first port 116a and discharges hydraulic fluid into the second distribution line segment 133b via the second port 116b. In the example where the second port 116b is operating as the inlet port of the bi-directional pump 110 and the first port 116a is operating as the outlet port of the bi-directional pump 110, the bi-directional pump 110 draws in hydraulic fluid from the second distribution line segment 133b via the second port 116b and discharges hydraulic fluid into the first distribution line segment 133a via the first port 116a.

The suspension system 100 also includes a front left bridge line 140a that extends between and fluidly connects the first hydraulic line 132a of the first hydraulic circuit 120a and the second hydraulic line 132b of the second hydraulic circuit 120b at a position located near the front left damper 102a, a front right bridge line 140b that extends between and fluidly connects the first hydraulic line 132a of the first hydraulic circuit 120a and the second hydraulic line 132b of the second hydraulic circuit 120b at a position located near the front right damper 102b, a back left bridge line 140c that extends between and fluidly connects the third hydraulic line 132c of the third hydraulic circuit 120c and the fourth hydraulic line 132d of the fourth hydraulic circuit 120d at a position located near the back left damper 102c, and a back right bridge line 140d that extends between and fluidly connects the third hydraulic line 132c of the third hydraulic circuit 120c and the fourth hydraulic line 132d of the fourth hydraulic circuit 120d at a position located near the back right damper 102d. The various hydraulic lines shown in the illustrated example are made of flexible tubing (e.g., hydraulic hoses), but it should be appreciated that other conduit structures and/or fluid passageways can be used.

The first hydraulic circuit 120a includes a first pair of variable flow control valves 160, 162 that are arranged at each end of the first hydraulic line 132a and are configured to regulate fluid flow between the first hydraulic circuit 120a and the first compression chamber 126a of the front left damper 102a and between the first hydraulic circuit 120a and the second rebound chamber 128b of the front right damper 102b, respectively. Similarly, the second hydraulic circuit 120b includes a second pair of variable flow control valves 164, 166 that are configured to regulate fluid flow between the second hydraulic circuit 120b and the first rebound chamber 128a of the front left damper 102a and between the first hydraulic circuit 120a and the second compression chamber 126b of the front right damper 102b, respectively. The third hydraulic circuit 120c includes a third pair of variable flow control valves 168, 170 that are arranged at each end of the third hydraulic line 132c and are configured to regulate fluid flow between the third hydraulic circuit 120c and the third compression chamber 126c of the back left damper 102c and between the third hydraulic circuit 120c and the fourth rebound chamber 128d of the back right damper 102d, respectively. Finally, the fourth hydraulic circuit 120d includes a fourth pair of variable flow control valves 172, 174 that are configured to regulate fluid flow between the fourth hydraulic circuit 120d and the third rebound chamber 128c of the back left damper 102c and between the fourth hydraulic circuit 120d and the fourth compression chamber 126d of the back right damper 102d, respectively. The variable flow control valves 160, 162, 164, 166, 168, 170, 172, 174 may be passive/spring-biased valves (e.g., spring-disc stacks) or active valves (e.g., electromechanical valves) and operate by controlling fluid flow into and out of the compression chambers 126a, 126b, 126c, 126d and rebound chambers 128a, 128b, 128c, 128d of the dampers 102a, 102b, 102c, 102d to change/adjust the rebound dampening rates and compression dampening rates. By way of example and without limitation, the variable flow control valves 160, 162, 164, 166, 168, 170, 172, 174 may be electromechanical valves with a combination of passive spring-disk elements and a solenoid. The solenoid of the variable flow control valves 160, 162, 164, 166, 168, 170, 172, 174 may be electrically connected to and actuated by controller 180 to change the damping characteristics of the dampers 102a, 102b, 102c, 102d (e.g., to soften or firm up the ride).

A front left accumulator 142a is arranged in fluid communication with the first hydraulic line 132a such that the front left accumulator 142a is configured to regulate fluid pressure within the first hydraulic circuit 120a. A front right accumulator 142b is arranged in fluid communication with the second hydraulic line 132b such that the front right accumulator 142b is configured to regulate fluid pressure within the second hydraulic circuit 120b. A back left accumulator 142c is arranged in fluid communication with the third hydraulic line 132c such that the back left accumulator 142c is configured to regulate fluid pressure within the third hydraulic circuit 120c. A back right accumulator 142d is arranged in fluid communication with the fourth hydraulic line 132d such that the back right accumulator 142d is configured to regulate fluid pressure within the fourth hydraulic circuit 120d. Each of the accumulators 142a, 142b, 142c, 142d have a variable fluid volume that increases and decreases depending on the fluid pressure in the hydraulic circuits 120a, 120b, 120c, 120d. It should be appreciated that the accumulators 142a, 142b, 142c, 142d may be constructed in a number of different ways. For example and without limitation, the accumulators 142a, 142b, 142c, 142d may have accumulation chambers and pressurized gas chambers that are separated by floating pistons, flexible membranes, or bellows.

The suspension system 100 also includes seven electro-mechanical shut-off (i.e., on/off) valves 144a, 144b, 144c, 144d, 145a, 145b, 146. A front left shut-off valve 144a is positioned in the front left bridge line 140a, a front right shut-off valve 144b is positioned in the front right bridge line 140b, a back left shut-off valve 144c is positioned in the back left bridge line 140c, and a back right shut-off valve 144d is positioned in the back right bridge line 140d. A first distribution line shut-off valve 145a is positioned in the first distribution line segment 133a of the fluid distribution line 131 between the first longitudinal hydraulic line 130a and the bi-directional pump 110 and a second distribution line shut-off valve 145b is positioned in the second distribution line segment 133b of the fluid distribution line 131 between the second longitudinal hydraulic line 130b and the bi-directional pump 110. A reservoir shut-off valve 146 is positioned in the reservoir line 114 between the fluid distribution line 131 and the hydraulic fluid reservoir 112. In the illustrated example, the shut-off valves 144a, 144b, 144c, 144d, 145a, 145b, 146 are semi-active electro-mechanical valves with a combination of passive spring-disk elements and a solenoid that actuates the valve between open and closed positions.

When both the first and second distribution line shut-off valves 145a, 145b are open and the reservoir shut-off valve 146 is closed, the bi-directional pump 110 can operate to pump hydraulic fluid from the first longitudinal hydraulic line 130a and therefore from the first and third hydraulic circuits 120a, 120c to the second longitudinal hydraulic line 130b and therefore to the second and fourth hydraulic circuits 120b, 120d or vice versa (from the second longitudinal hydraulic line 130b and therefore from the second and fourth hydraulic circuits 120b, 120d to the first longitudinal hydraulic line 130a and therefore to the first and third hydraulic circuits 120a, 120c). When the first distribution line shut-off valve 145a is closed and both the second distribution line shut-off valve 145b and the reservoir shut-off valve 146 are open, the bi-directional pump 110 can operate to pump hydraulic fluid from hydraulic fluid reservoir 112 and to the second longitudinal hydraulic line 130b or from the second longitudinal hydraulic line 130b and to the hydraulic fluid reservoir 112. This ultimately has the effect of increasing or decreasing the static fluid pressure in all four hydraulic circuits 120a-120d if shut-off valves 144a-144d are all open so hydraulic fluid can flow through the bridge lines 140a-140d.

The bi-directional pump 110 and the shut-off valves 144a, 144b, 144c, 144d, 145a, 145b, 146 are electrically connected to a controller 180, which is configured to activate (i.e., turn on in forward or reverse) the bi-directional pump 110 and individually open and close the shut-off valves 144a, 144b, 144c, 144d, 145a, 145b, 146 in response to various inputs, including fluid pressure. The anti-pitch and anti-roll capabilities of the suspension system 100 will be explained in greater detail below; however, from FIG. 2 it should be appreciated that fluid pressure in the hydraulic circuits 120a, 120b, 120c, 120d can be adjusted by operation of the bi-directional pump 110 to dynamically adjust the pitch and roll stiffness of the suspension system 100, which changes the degree to which the vehicle will lean fore or aft (i.e., pitch) or to one side or the other (i.e., roll). Thus, the suspension system 100 described herein can either augment or completely replace mechanical stabilizer bars/anti-roll bars. Such mechanical systems require relatively straight, unobstructed runs between each of the front dampers 102a, 102b and each of the back dampers 102c, 102d. Accordingly, the suspension system 100 disclosed herein offers packaging benefits because the dampers 102a, 102b, 102c, 102d only need to be hydraulically connected to one another and the bi-directional pump 110.

There are three primary types of suspension movements that the illustrated suspension system 100 can passively or actively control by changing or adapting the roll and/or pitch stiffness of the vehicle: leaning to one side or the other during cornering (i.e., roll), pitching forward during braking (i.e., brake dive), and pitching aft during acceleration (i.e., rear end squat). Descriptions of how the suspension system 100 reacts to each of these conditions are provided below.

Figure 3:
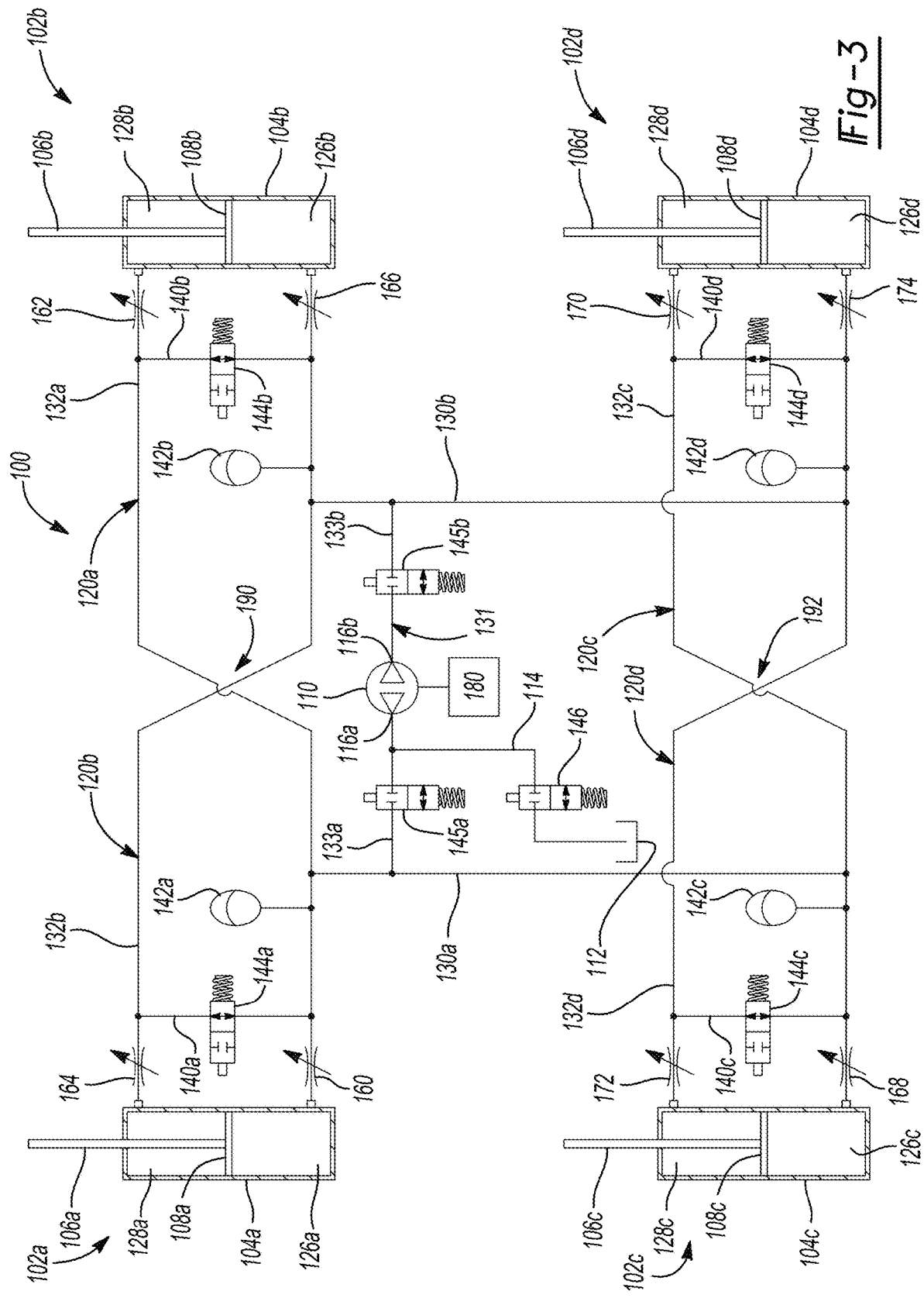
FIG. 3 is a schematic diagram illustrating the exemplary suspension system shown in FIG. 2 as it is operating in a first comfort mode.

FIG. 3 illustrates the suspension system 100 in a first comfort operating mode. When passive or active roll and/or pitch stiffness is not required, the controller 180 may activate the first comfort operating mode by opening the front left shut-off valve 144a, front right shut-off valve 144b, back left shut-off valve 144c, and back right shut-off valve 144d, while closing the first and second distribution line shut-off valves 145a, 145b and the reservoir shut-off valve 146. In the first comfort operating mode, the bi-directional pump 110 is powered off to maintain substantially equal static pressures within all four hydraulic circuits 120a, 120b, 120c, 120d. In the first comfort operation mode fluid flow is therefore permitted through valves 144a, 144b, 144c, 144d to enhance the ride comfort of the suspension system 100 and reduce or eliminate unwanted suspension movements resulting from the hydraulic coupling of one damper of the system to another damper of the system (e.g., where the compression of one damper causes movement and/or a dampening change in another damper). For example, when the front left comfort valve 144a is open and the front left damper 102a undergoes a compression stroke as the front wheel hits a bump, fluid may flow from the first compression chamber 126a of the front left damper 102a, into the first hydraulic line 132a, from the first hydraulic line 132a to the second hydraulic line 132b by passing through the front left bridge line 140a and the front left comfort valve 144a, and into the first rebound chamber 128a of the front left damper 102a. Thus, fluid can travel from the first compression chamber 126a to the first rebound chamber 128a of the front left damper 102a with the only restriction coming from the variable control valves 160, 164, if any. As such, in the comfort operating mode, the dampers 102a, 102b, 102c, 102d are effectively decoupled from one another for improved ride comfort.

Figure 4:
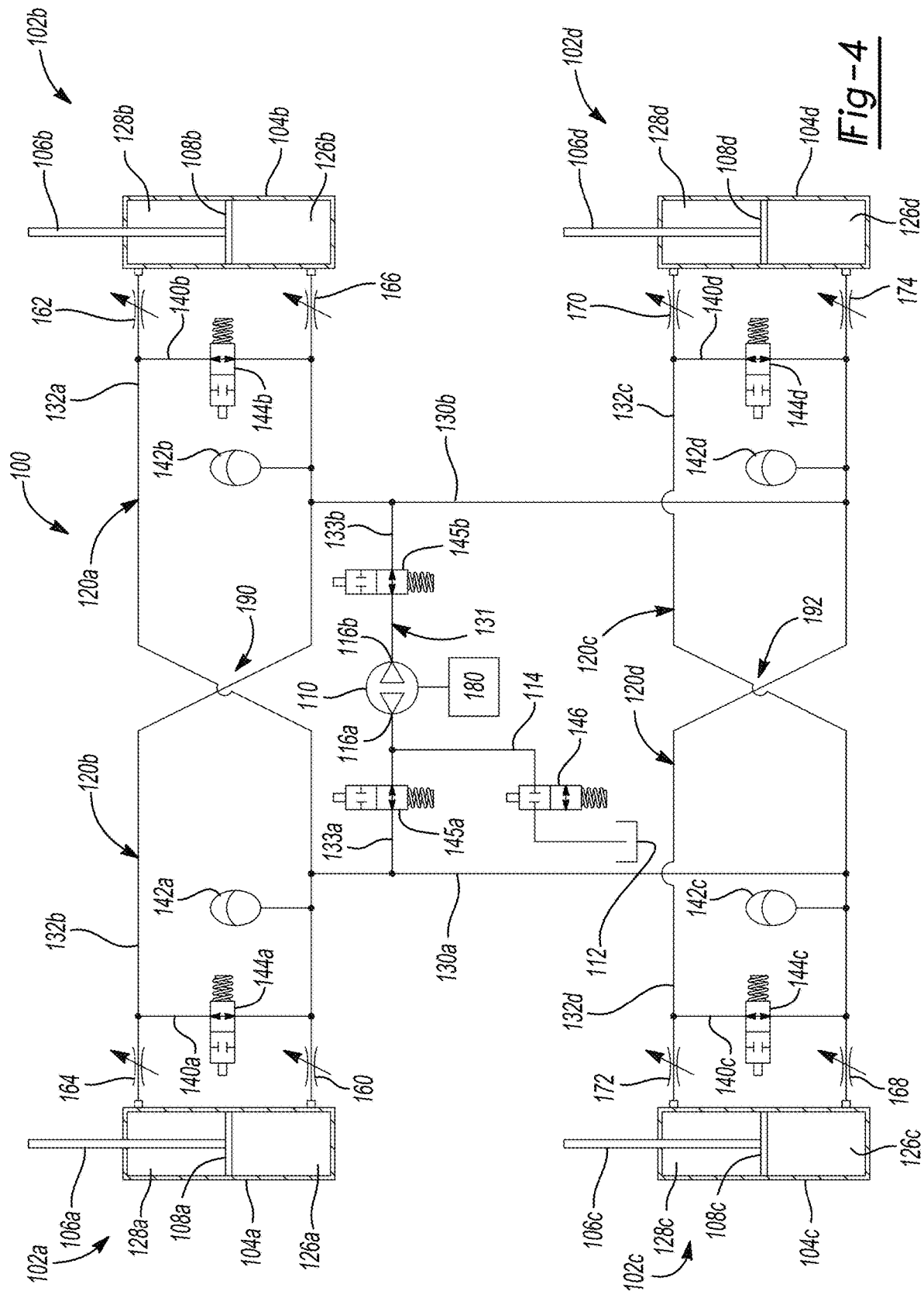
FIG. 4 is a schematic diagram illustrating the exemplary suspension system shown in FIG. 2 as it is operating in a second comfort mode.

FIG. 4 illustrates the suspension system 100 in a second comfort operating mode. The second comfort operating mode is similar to the first comfort operating mode, except that in the second comfort operating mode the first and second distribution line shut-off valves 145a, 145b are open such that hydraulic fluid can flow through the fluid distribution line 131. The controller 180 may activate the second comfort operating mode by opening the front left shut-off valve 144a, front right shut-off valve 144b, back left shut-off valve 144c, and back right shut-off valve 144d, and the first and second distribution line shut-off valves 145a, 145b, while closing the reservoir shut-off valve 146. In the second comfort operating mode, the bi-directional pump 110 is placed in a free-running condition (i.e., the bi-directional pump 110 is powered off, but still permits fluid flow through the bi-directional pump 110). In the example where the bi-directional pump 110 includes an impeller, the impeller of the bi-directional pump 110 is permitted to spin freely in the second comfort operating mode and has some inertia, which provides additional damping to pressure/flow disturbances in the suspension system 100. In other words, in the second comfort operating mode, pressure/flow disturbances can flow from the first longitudinal hydraulic line 130a to the second longitudinal hydraulic line 130b or vice versa by passing through the fluid distribution line 131 and the bi-directional pump 110. This larger/expanded network of hydraulic lines/conduits with greater fluid volume, inertial resistance, and/or flow restriction can help attenuate pressure/flow disturbances at certain frequencies to reduce the response one impact event can have on other dampers 102a-102d in the suspension system 100 as a result of hydraulic coupling.

Figure 5:
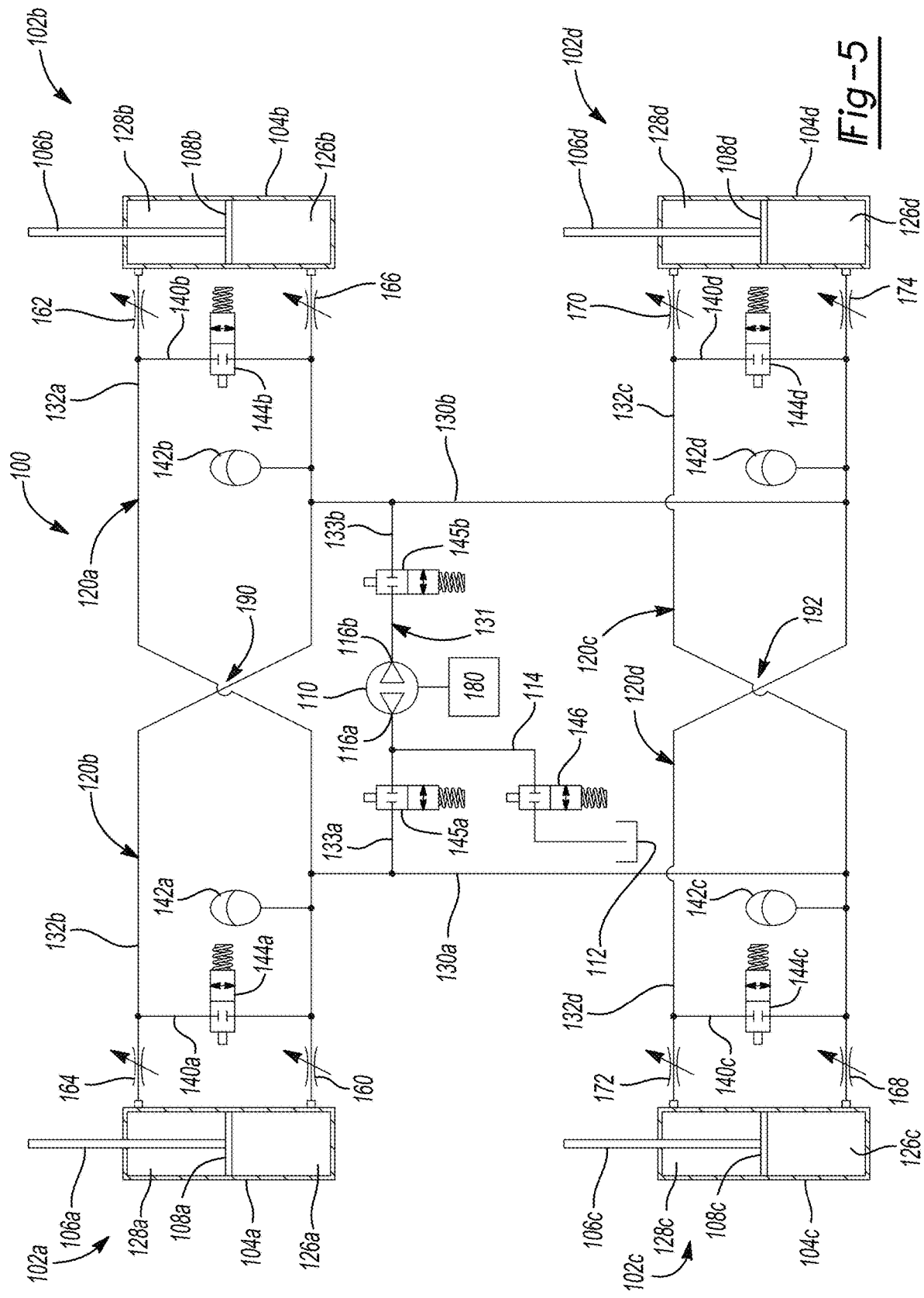
FIG. 5 is a schematic diagram illustrating the exemplary suspension system shown in FIG. 2 as it is operating in a passive roll control mode.

FIG. 5 illustrates the suspension system 100 in a passive roll control operating mode. The controller 180 activates the passive roll control operating mode by closing the front left shut-off valve 144a, front right shut-off valve 144b, back left shut-off valve 144c, back right shut-off valve 144d, the first and second distribution line shut-off valves 145a, 145b, and the reservoir shut-off valve 146. In addition, the bi-directional pump 110 is deactivated in the passive roll control operating mode.

When the vehicle is placed in a left turn, the momentum of the sprung weight of the vehicle body 103 tends to make the vehicle lean right towards the outside of the turn, compressing the front right damper 102b and the back right damper 102d. When this occurs, fluid flows out from the second compression chamber 126b of the front right damper 102b and the fourth compression chamber 126d of the back right damper 102d into the second and fourth hydraulic lines 132b, 132d. As a result of the weight transfer to the right side of the vehicle, the front left damper 102a and back left damper 102c begin to extend, causing fluid to flow out of the first rebound chamber 128a of the front left damper 102a and the third rebound chamber 128c of the back left damper 102c into the second and fourth hydraulic lines 132b, 132d causing pressure in the second and fourth hydraulic lines 132b, 132d to increase even further, which increases the pressure in the second compression chamber 126b of the front right damper 102b and the fourth compression chamber 126d of the back right damper 102d making the front right damper 102b and the back right damper 102d more difficult to compress. This counteracts the momentum/roll moment of the sprung weight of the vehicle body 103 as it attempts to roll or lean to the right.

When the vehicle is placed in a right turn, the momentum of the sprung weight of the vehicle body 103 tends to make the vehicle lean left towards the outside of the turn, compressing the front left damper 102a and the back left damper 102c. When this occurs, fluid flows out from the first compression chamber 126a of the front left damper 102a and the third compression chamber 126c of the back left damper 102c into the first and third hydraulic lines 132a, 132c. As a result of the weight transfer to the left side of the vehicle, the front right damper 102b and back right damper 102d begin to extend, causing fluid to flow out of the second rebound chamber 128b of the front right damper 102b and the fourth rebound chamber 128d of the back right damper 102d into the first and third hydraulic lines 132a, 132c causing pressure in the first and third hydraulic lines 132a, 132c to increase even further, which increases the pressure in the first compression chamber 126a of the front left damper 102a and the third compression chamber 126c of the back left damper 102c making the front left damper 102a and the back left damper 102c more difficult to compress. This counteracts the momentum/roll moment of the sprung weight of the vehicle body 103 as it attempts to roll or lean to the left.

Figure 6:
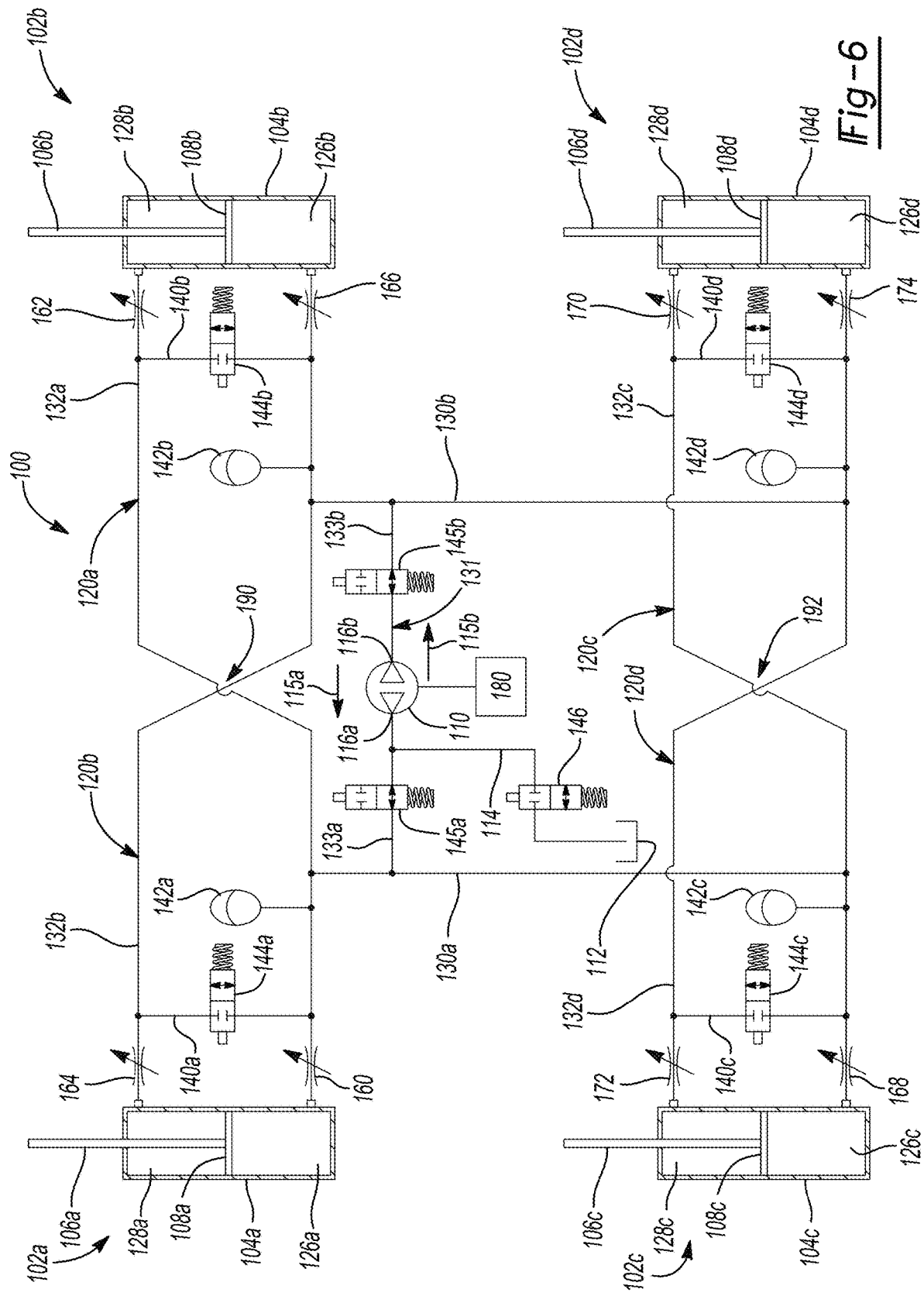
FIG. 6 is a schematic diagram illustrating the exemplary suspension system shown in FIG. 2 as it is operating in an active roll control mode.

FIG. 6 illustrates the suspension system 100 in an active roll control operating mode. When the vehicle is placed in a left turn, the momentum of the sprung weight of the vehicle body 103 tends to make the vehicle lean right towards the outside of the turn, compressing the front right damper 102b and the back right damper 102d. When this occurs, fluid flows out from the second compression chamber 126b of the front right damper 102b and the fourth compression chamber 126d of the back right damper 102d into the second and fourth hydraulic lines 132b, 132d. As a result of the weight transfer to the right side of the vehicle, the front left damper 102a and back left damper 102c begin to extend, causing fluid to flow out of the first rebound chamber 128a of the front left damper 102a and the third rebound chamber 128c of the back left damper 102c into the second and fourth hydraulic lines 132b, 132d. As this occurs, the controller 180 activates the active roll control operating mode by closing the front left shut-off valve 144a, front right shut-off valve 144b, back left shut-off valve 144c, back right shut-off valve 144d, and the reservoir shut-off valve 146, while opening the first and second distribution line shut-off valves 145a, 145b and activating the bi-directional pump 110 to pump hydraulic fluid in the first direction 115a from the first distribution line segment 133a and therefore the first longitudinal hydraulic line 130a and into the second distribution line segment 133b and therefore the second longitudinal hydraulic line 130b. In this example, the second port 116b is operating as an outlet port for the bi-directional pump 110 and the first port 116a is operating as an inlet port for the bi-directional pump 110. Accordingly, the bi-directional pump 110 draws in hydraulic fluid from the first distribution line segment 133a via the first port 116a and discharges hydraulic fluid into the second distribution line segment 133b via the second port 116b such that the bi-directional pump 110 operates to increase fluid pressure in the second longitudinal hydraulic line 130b, which increases the pressure in the second hydraulic circuit 120b and therefore the second compression chamber 126b of the front right damper 102b and the fourth hydraulic circuit 120d and therefore the fourth compression chamber 126d of the back right damper 102d, the making the front right damper 102b and the back right damper 102d more difficult to compress. This counteracts the momentum/roll moment of the sprung weight of the vehicle body 103 as it attempts to roll or lean to the right during a left turn.

When the vehicle is placed in a right turn, the momentum of the sprung weight of the vehicle body 103 tends to make the vehicle lean left towards the outside of the turn, compressing the front left damper 102a and the back left damper 102c. When this occurs, fluid flows out from the first compression chamber 126a of the front left damper 102a and the third compression chamber 126c of the back left damper 102c into the first and third hydraulic lines 132a, 132c. As a result of the weight transfer to the left side of the vehicle, the front right damper 102b and back right damper 102d begin to extend, causing fluid to flow out of the second rebound chamber 128b of the front right damper 102b and the fourth rebound chamber 128d of the back right damper 102d into the first and third hydraulic lines 132a, 132c. As this occurs, the controller 180 activates the active roll control operating mode by closing the front left shut-off valve 144a, front right shut-off valve 144b, back left shut-off valve 144c, back right shut-off valve 144d, and the reservoir shut-off valve 146, while opening the first and second distribution line shut-off valves 145a, 145b and activating the bi-directional pump 110 to pump hydraulic fluid in a second direction 115b from the second distribution line segment 133b and therefore the second longitudinal hydraulic line 130b and into the first distribution line segment 133a and therefore the first longitudinal hydraulic line 130a. In accordance with this example, the first port 116a is operating as an outlet port for the bi-directional pump 110 and the second port 116b is operating as an inlet port for the bi-directional pump 110. Accordingly, the bi-directional pump 110 draws in hydraulic fluid from the second distribution line segment 133b via the second port 116b and discharges hydraulic fluid into the first distribution line segment 133a via the first port 116a such that the bi-directional pump 110 operates to increase fluid pressure in the first longitudinal hydraulic line 130a, which increases the pressure in the first hydraulic circuit 120a and therefore the first compression chamber 126a of the front left damper 102a and the third hydraulic circuit 120c and therefore the third compression chamber 126c of the back left damper 102c, making the front left damper 102a and the back left damper 102c more difficult to compress. This counteracts the momentum/roll moment of the sprung weight of the vehicle body 103 as it attempts to roll or lean to the left during a right turn.

Figure 7:
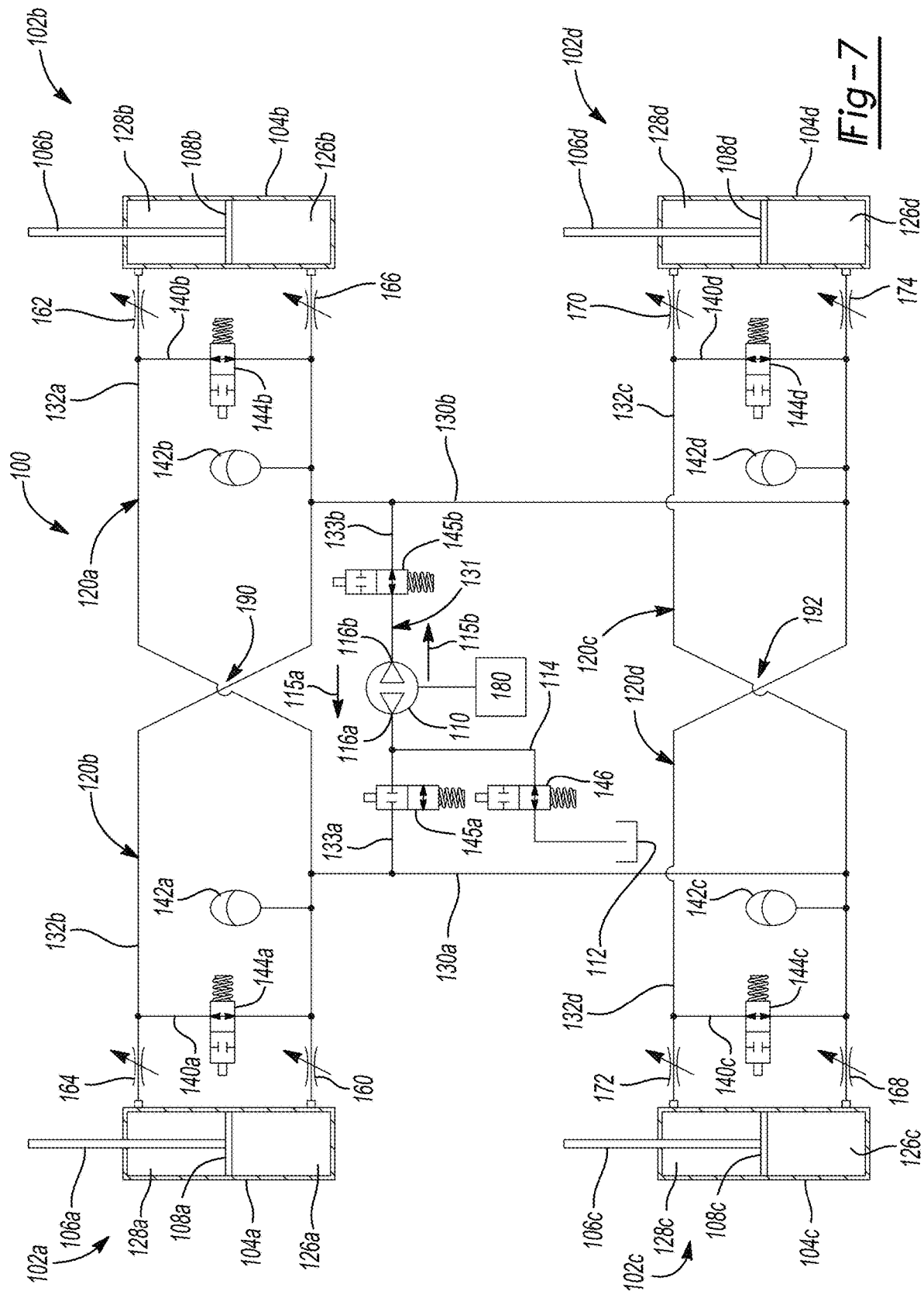
FIG. 7 is a schematic diagram illustrating the exemplary suspension system shown in FIG. 2 as it is operating in a pressure control mode.

FIG. 7 illustrates the suspension system 100 when the controller 180 initiates a pressure control operating mode. To raise fluid pressure in the hydraulic circuits 120a, 120b, 120c, 120d of the suspension system 100, the controller 180 activates the bi-directional pump 110 to pump hydraulic fluid in the first direction 115a from the hydraulic fluid reservoir 112 via the reservoir line 114 and into the second longitudinal hydraulic line 130b via the second distribution line segment 133b. In this example, the front left shut-off valve 144a, front right shut-off valve 144b, back left shut-off valve 144c, back right shut-off valve 144d are all open and the first distribution line shut-off valve 145a is closed, and both the second distribution line shut-off valve 145b and the reservoir shut-off valve 146 are open. The first port 116a is operating as the inlet port of the bi-directional pump 110 and the second port 116b is operating as the outlet port of the bi-directional pump 110. Accordingly, the bi-directional pump 110 draws in hydraulic fluid from the first distribution line segment 133a via the first port 116a and discharges hydraulic fluid into the second distribution line segment 133b via the second port 116b. Because the front left shut-off valve 144a, front right shut-off valve 144b, back left shut-off valve 144c, back right shut-off valve 144d are all open, the static pressure in all of the hydraulic circuits 120a, 120b, 120c, 120d is increased.

To reduce fluid pressure in the hydraulic circuits 120a, 120b, 120c, 120d of the suspension system 100, the controller 180 activates the bi-directional pump 110 to pump hydraulic fluid in the second direction 115b from the second longitudinal hydraulic line 130b via the second distribution line segment 133b and into the hydraulic fluid reservoir 112 via the reservoir line 114. In this example, the front left shut-off valve 144a, front right shut-off valve 144b, back left shut-off valve 144c, back right shut-off valve 144d are all open and the first distribution line shut-off valve 145a is closed, and both the second distribution line shut-off valve 145b and the reservoir shut-off valve 146 are open. The second port 116b is operating as the inlet port of the bi-directional pump 110 and the first port 116a is operating as the outlet port of the bi-directional pump 110. Accordingly, the bi-directional pump 110 draws in hydraulic fluid from the second distribution line segment 133b via the second port 116b and discharges hydraulic fluid into the first distribution line segment 133a via the first port 116a. Because the front left shut-off valve 144a, front right shut-off valve 144b, back left shut-off valve 144c, back right shut-off valve 144d are all open, the static pressure in all of the hydraulic circuits 120a, 120b, 120c, 120d is reduced.

Figure 8:
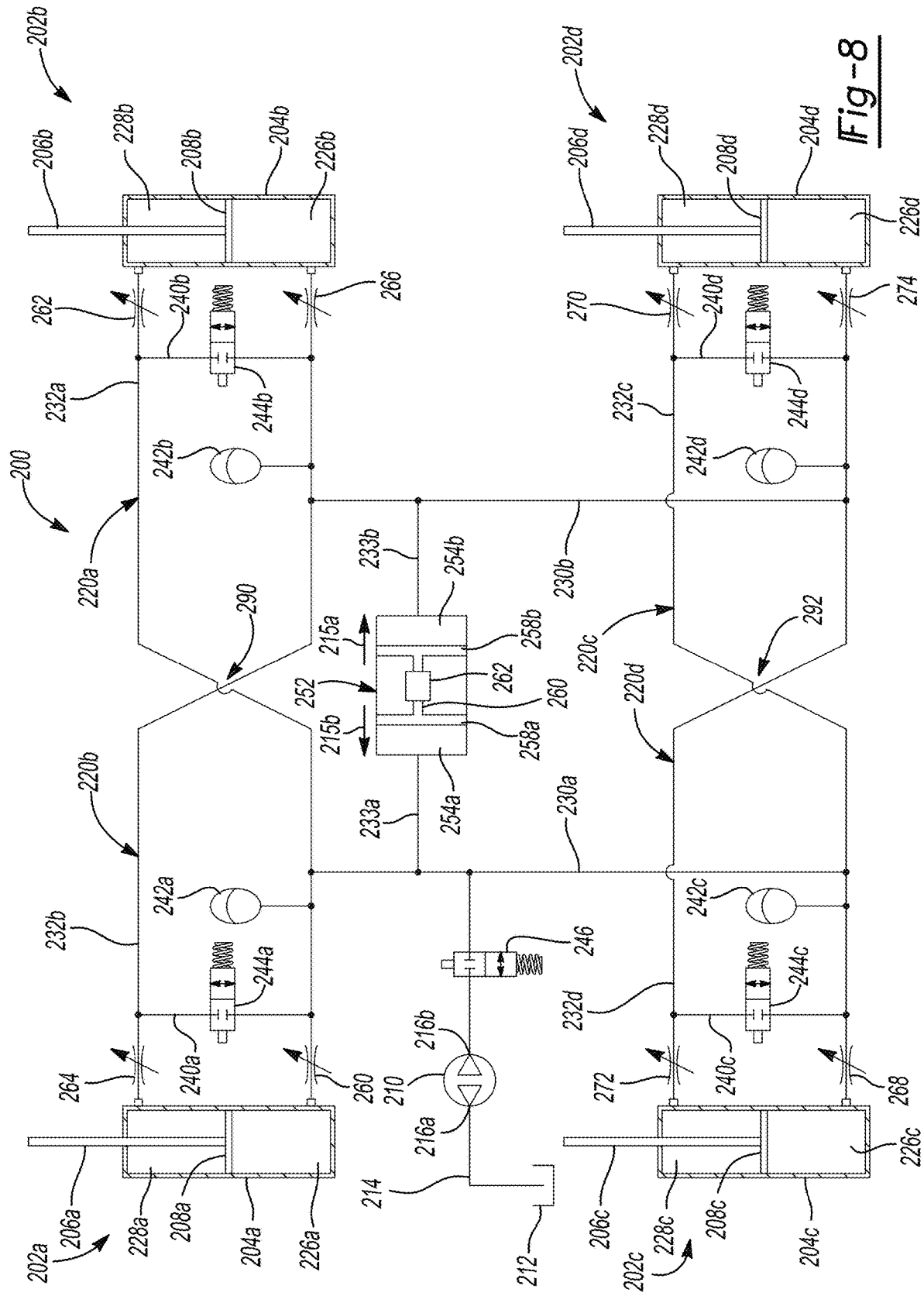
FIG. 8 is a schematic diagram illustrating another exemplary suspension system of the present disclosure that includes a centralized dual chamber ball-screw mechanism and a bi-directional pump.
Figure 9:
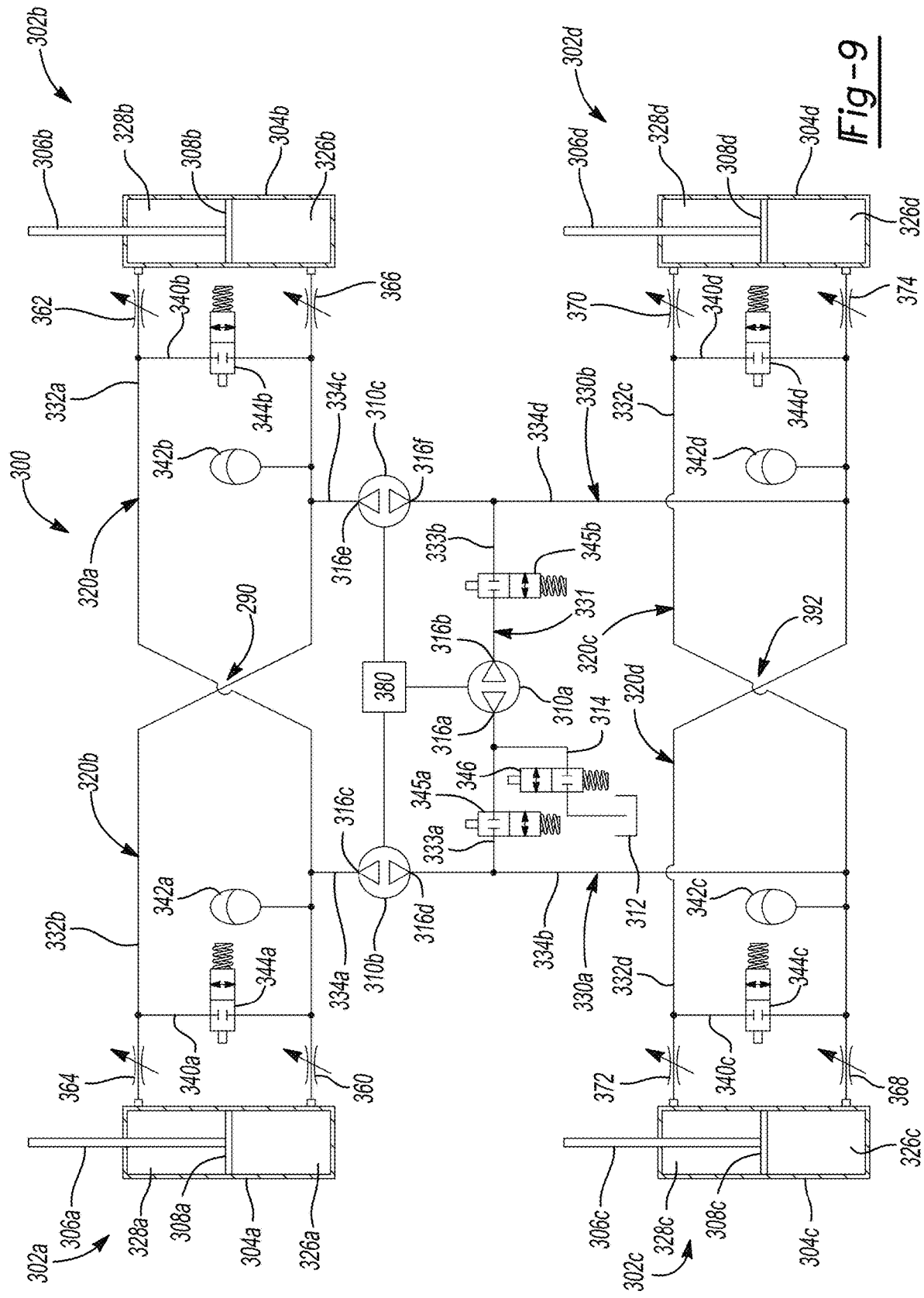
FIG. 9 is a schematic diagram illustrating another exemplary suspension system of the present disclosure that includes three bi-directional pumps.

FIG. 8 illustrates another suspension system 200 that shares many of the same components as the suspension system 100 illustrated in FIGS. 2-7, but the bi-directional pump 110 shown in FIGS. 2-7 has been moved and a dual chamber ball-screw mechanisms 252 has been added to the suspension system 200 shown in FIG. 8. With these changes, the first and second distribution line shut-off valves 145a, 145b in FIGS. 2-7 have been eliminated in the suspension system 200 shown in FIG. 8. Rather than repeat the description set forth above, the following paragraphs describe the structure and function of the components in FIG. 8 that are new and/or different from those shown and described in connection with FIGS. 2-7. It should be appreciated that the reference numbers in FIG. 8 are "200" series numbers (e.g., 200, 202a, 204a, etc.), but otherwise share the same base reference numbers as the corresponding elements in FIGS. 2-7. Thus, the same description for elements 100, 102a, 104a above applies to elements 200, 202a, 204a in FIG. 8 and so on and so forth, except as otherwise noted.

In FIG. 8, the first longitudinal hydraulic line 230a is connected to the hydraulic fluid reservoir 212 by reservoir line 214. In this embodiment, the bi-directional pump 210 is arranged along and connected in-line with the reservoir line 214 and the reservoir shut-off valve 246 is positioned along the reservoir line 214 between the first longitudinal hydraulic line 230a and the bi-directional pump 210. The bi-directional pump 210 can operate (i.e., pump fluid) in two opposing directions to either pump fluid into or out of the first longitudinal hydraulic line 230a. Thus, when the front left shut-off valve 244a, front right shut-off valve 244b, back left shut-off valve 244c, back right shut-off valve 244d, and the reservoir shut-off valve 246 are all open, the bi-directional pump 210 may operate to either increase or decrease fluid pressure in all of the hydraulic circuits 220a-220d (i.e., to raise or lower the system pressure).

As its name implies, the dual chamber ball-screw mechanism 252 includes a first variable volume chamber 254a and a second variable volume chamber 254b at opposing ends of a cylinder housing 256. The first variable volume chamber 254a is arranged in fluid communication with the first distribution line 233a and therefore the first longitudinal hydraulic line 230a, while the second variable volume chamber 254b is arranged in fluid communication with the second distribution line 233b and therefore the second longitudinal hydraulic line 230b. The first and second variable volume chambers 254a, 254b are separated by a pair of driven pistons 258a, 258b, which are connected to a move together in unison with a threaded rod 260. The dual chamber ball-screw mechanisms 252 also includes a motor 262 that is arranged in threaded engagement with the threaded rod 260 and is therefore configured to drive the threaded rod 260 and therefore the pair of driven pistons 258a, 258b in first and second directions 215a, 215b within the cylinder housing 256. The first and second directions 215a, 215b are longitudinally opposed in relation to one another.

When the motor 262 drives the threaded rod 260 and thus the pair of driven pistons 258a, 258b in the first direction 215a, the volume of the first variable volume chamber 254a increases while the volume of the second variable volume chamber 254b decreases. This causes hydraulic fluid in the first distribution line segment 233a to flow into the first variable volume chamber 254a and hydraulic fluid in the second variable volume chamber 254b to flow out into the second distribution line 233b, which decreases fluid pressure in the first longitudinal hydraulic line 230a (and therefore decreases fluid pressure in the first and third hydraulic circuits 220a, 220c) and increases fluid pressure in the second longitudinal hydraulic line 230b (and therefore increases fluid pressure in the second and fourth hydraulic circuits 220b, 220d). When the motor 262 drives the threaded rod 260 and thus the pair of driven pistons 258a, 258b in the second direction 215b, the volume of the first variable volume chamber 254a decreases while the volume of the second variable volume chamber 254b increases. This causes hydraulic fluid in the first variable volume chamber 254a to flow out into the first distribution line 233a and hydraulic fluid in the second distribution line 233b to flow into the second variable volume chamber 254b, which increases fluid pressure in the first longitudinal hydraulic line 230a (and therefore increases fluid pressure in the first and third hydraulic circuits 220a, 220c) and decreases fluid pressure in the second longitudinal hydraulic line 230b (and therefore decreases fluid pressure in the second and fourth hydraulic circuits 220b, 220d).

The motor 262 is electrically connected to and controlled by controller 280 and rotate in clockwise or counterclockwise directions depending on the polarity of the electric current supplied to the motor 262 by the controller 280. This in turn drives linear/longitudinal movement of the threaded rod 260 in opposite directions. Thus, the controller 280 can implement the same operating modes described above in connection with FIGS. 3-7.

FIGS. 9-17 illustrates another suspension system 300 that shares many of the same components as the suspension system 100 illustrated in FIGS. 2-7, but includes three bi-directional pumps 310a, 310b, 310c. Rather than repeat the description set forth above, the following paragraphs describe the structure and function of the components in FIGS. 9-17 that are new and/or different from those shown and described in connection with FIGS. 2-7. It should be appreciated that the reference numbers in FIGS. 9-17 are "300" series numbers (e.g., 300, 302a, 304a, etc.), but otherwise share the same base reference numbers as the corresponding elements in FIGS. 2-7. Thus, the same description for elements 100, 102a, 104a above applies to elements 300, 302a, 304a in FIGS. 9-17 and so on and so forth, except as otherwise noted.

The suspension system 300 includes a first bi-directional pump 310a that is arranged along and connected in-line with a fluid distribution line 331 that extends between and interconnects the first and second longitudinal hydraulic lines 330a, 330b. The suspension system 300 also includes a second bi-directional pump 310b that is arranged along and connected in-line with the first longitudinal hydraulic line 330a and a third bi-directional pump 310c is arranged along and connected in-line with the second longitudinal hydraulic line 330b. The fluid distribution line 331 includes a first distribution line segment 333a that extends between and fluidly connects the first longitudinal hydraulic line 330a with a first port 316a on the first bi-directional pump 310a and a second distribution line segment 333b that extends between and fluidly connects the second longitudinal hydraulic line 330b and a second port 316b on the first bi-directional pump 310a. The first longitudinal hydraulic line 330a includes a first hydraulic line segment 334a that extends between and fluidly connects the first hydraulic line 332a with a third port 316c on the second bi-directional pump 310b and a second hydraulic line segment 334b that extends between and fluidly connects the third hydraulic line 332c with a fourth port 316b on the second bi-directional pump 310b. The second longitudinal hydraulic line 330b includes a third hydraulic line segment 334c that extends between and fluidly connects the second hydraulic line 332b with a fifth port 316e on the third bi-directional pump 310c and a fourth hydraulic line segment 334d that extends between and fluidly connects the fourth hydraulic line 332d with a sixth port 316f on the third bi-directional pump 310. Each bi-directional pump 310a, 310b, 310c can operate (i.e., pump fluid) in two opposing directions depending on the polarity of the electricity that is supplied to the bi-directional pump 310a, 310b, 310c.

The first port 316a of the first bi-directional pump 310a may operate as either an inlet port or an outlet port depending on the direction the first bi-directional pump 310a is operating in and the same is true for the second port 316b of the first bi-directional pump 310a. As a result, the first bi-directional pump 310a can operate to pump hydraulic fluid from the first distribution line segment 333a of the fluid distribution line 331 and therefore from either the first longitudinal hydraulic line 330a or the reservoir line 314 and to the second distribution line segment 333b of the fluid distribution line 331 and therefore to the second longitudinal hydraulic line 330b. The first bi-directional pump 310a can also operate in the opposite direction to pump hydraulic fluid from the second distribution line segment 333b of the fluid distribution line 331 and therefore from the second longitudinal hydraulic line 330b and to the first distribution line segment 333a of the fluid distribution line 331 and therefore to either the first longitudinal hydraulic line 330a or the reservoir line 314.

In the example where the first port 316a is operating as the inlet port of the first bi-directional pump 310a and the second port 316b is operating as the outlet port of the first bi-directional pump 310a, the first bi-directional pump 310a draws in hydraulic fluid from the first distribution line segment 333a via the first port 316a and discharges hydraulic fluid into the second distribution line segment 333b via the second port 316b. In the example where the second port 316b is operating as the inlet port of the first bi-directional pump 310a and the first port 316a is operating as the outlet port of the first bi-directional pump 310a, the first bi-directional pump 310a draws in hydraulic fluid from the second distribution line segment 333b via the second port 316b and discharges hydraulic fluid into the first distribution line segment 333a via the first port 316a.

The third port 316c of the second bi-directional pump 310b may operate as either an inlet port or an outlet port depending on the direction the second bi-directional pump 310*b* is operating in and the same is true for the fourth port 316*d* of the second bi-directional pump 310*b*. As a result, the second bi-directional pump 310*b* can operate to pump hydraulic fluid in a third direction 315*c* from the second hydraulic line segment 334*b* of the first longitudinal hydraulic line 330*a* and therefore from the third hydraulic circuit 320*c*, to the first hydraulic line segment 334*a* of the first longitudinal hydraulic line 330*a* and therefore to the first hydraulic circuit 320*a*, or in a fourth direction 315*b* from the first hydraulic line segment 334*a* of the first longitudinal hydraulic line 330*a* and therefore from the first hydraulic circuit 320*a*, to the second hydraulic line segment 334*b* of the first longitudinal hydraulic line 330*a* and therefore to the third hydraulic circuit 320*c*. In the example where the fourth port 316*d* is operating as an inlet port for the second bi-directional pump 310*b* and the third port 316*c* is operating as an outlet port for the second bi-directional pump 310*b*, the second bi-directional pump 310*b* draws in hydraulic fluid from the second hydraulic line segment 334*b* via the fourth port 316*d* and discharges hydraulic fluid into the first hydraulic line segment 334*a* via the third port 316*c*. In the example where the third port 316*c* is operating as an inlet port for the second bi-directional pump 310*b* and the fourth port 316*d* is operating as an outlet port for the second bi-directional pump 310*b*, the second bi-directional pump 310*b* draws in hydraulic fluid from the first hydraulic line segment 334*a* via the third port 316*c* and discharges hydraulic fluid into the second hydraulic line segment 334*b* via the fourth port 316*d*.

The fifth port 316*e* of the third bi-directional pump 310*c* may operate as either an inlet port or an outlet port depending on the direction the third bi-directional pump 310*c* is operating in and the same is true for the sixth port 316*f* of the third bi-directional pump 310*c*. As a result, the third bi-directional pump 310*c* can operate to pump hydraulic fluid in a fifth direction 315*e* from the fourth hydraulic line segment 334*d* of the second longitudinal hydraulic line 330*b* and therefore from the fourth hydraulic circuit 320*d*, to the third hydraulic line segment 334*c* of the second longitudinal hydraulic line 330*b* and therefore to the second hydraulic circuit 320*b*, or in a sixth direction 315*f* from the third hydraulic line segment 334*c* of the second longitudinal hydraulic line 330*b* and therefore from the second hydraulic circuit 320*b*, to the fourth hydraulic line segment 334*d* of the second longitudinal hydraulic line 330*b* and therefore to the fourth hydraulic circuit 320*d*. In the example where the sixth port 316*f* is operating as an inlet port for the third bi-directional pump 310*c* and the fifth port 316*e* is operating as an outlet port for the third bi-directional pump 310*c*, the third bi-directional pump 310*c* draws in hydraulic fluid from the fourth hydraulic line segment 334*d* via the sixth port 316*f* and discharges hydraulic fluid into the third hydraulic line segment 334*c* via the fifth port 316*e*. In the example where the fifth port 316*e* is operating as an inlet port for the third bi-directional pump 310*c* and the sixth port 316*f* is operating as an outlet port for the third bi-directional pump 310*c*, the third bi-directional pump 310*c* draws in hydraulic fluid from the third hydraulic line segment 334*c* via the fifth port 316*e* and discharges hydraulic fluid into the fourth hydraulic line segment 334*d* via the sixth port 316*f*.

Again, there are three primary types of suspension movements that the illustrated suspension system 300 can passively or actively control by changing or adapting the roll and/or pitch stiffness of the vehicle: leaning to one side or the other during cornering (i.e., roll), pitching forward during braking (i.e., brake dive), and pitching aft during acceleration (i.e., rear end squat). Descriptions of how the suspension system 300 reacts to each of these conditions are provided below.

Figure 10:
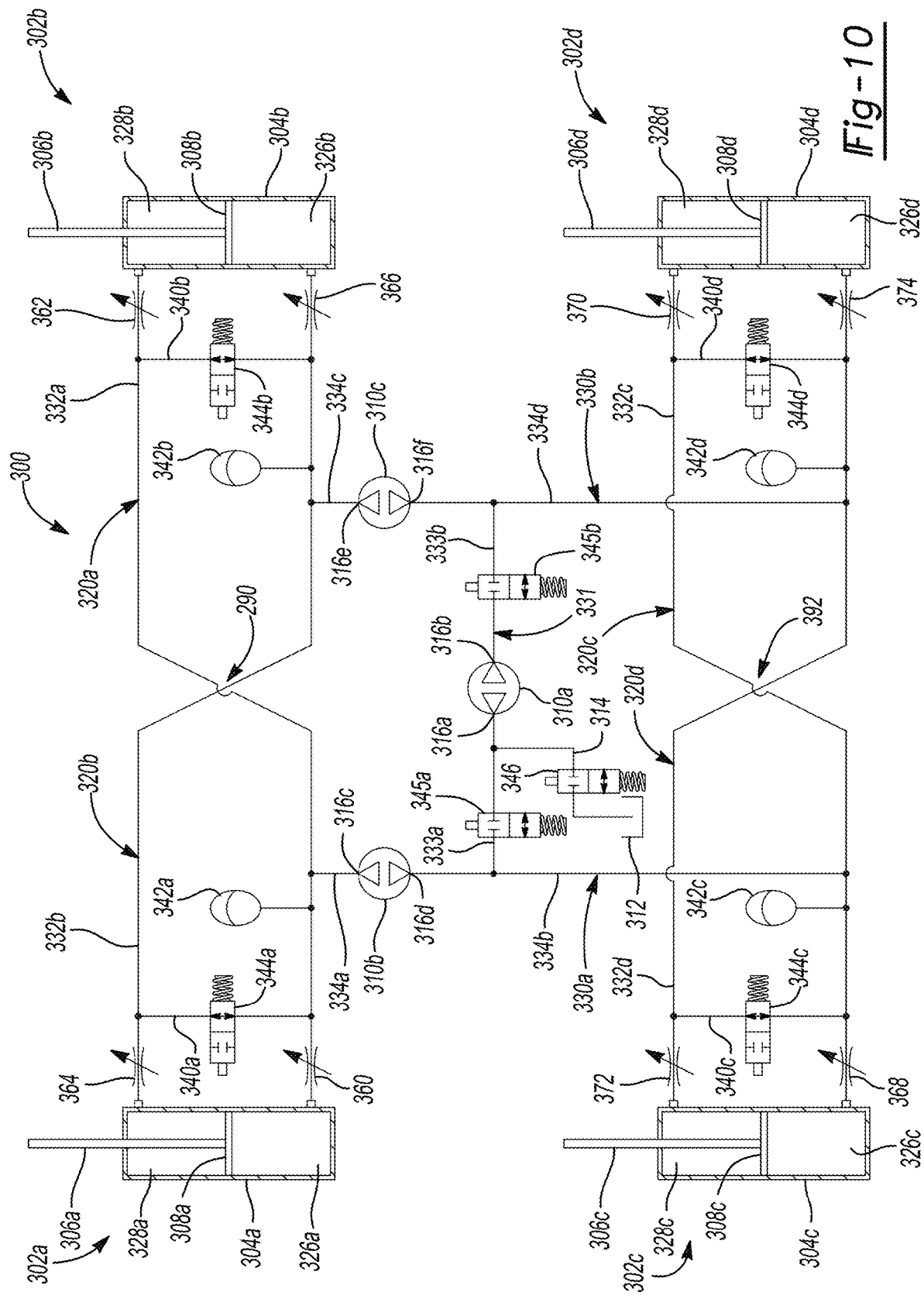
FIG. 10 is a schematic diagram illustrating the exemplary suspension system shown in FIG. 9 as it is operating in a first comfort mode.

FIG. 10 illustrates the suspension system 300 in a first comfort operating mode. When passive or active roll and/or pitch stiffness is not required, the controller 380 may activate the first comfort operating mode by opening the front left shut-off valve 344*a*, front right shut-off valve 344*b*, back left shut-off valve 344*c*, and back right shut-off valve 344*d*, while closing the first and second distribution line shut-off valves 345*a*, 345*b* and the reservoir shut-off valve 346. In the first comfort operating mode, the first, second, and third bi-directional pumps 310*a*, 310*b*, 310*c* are powered off to maintain substantially equal static pressures within all four hydraulic circuits 320*a*, 320*b*, 320*c*, 320*d*. In the first comfort operation mode fluid flow is therefore permitted through valves 344*a*, 344*b*, 344*c*, 344*d* to enhance the ride comfort of the suspension system 300 and reduce or eliminate unwanted suspension movements resulting from the hydraulic coupling of one damper of the system to another damper of the system (e.g., where the compression of one damper causes movement and/or a dampening change in another damper). For example, when the front left comfort valve 344*a* is open and the front left damper 302*a* undergoes a compression stroke as the front wheel hits a bump, fluid may flow from the first compression chamber 326*a* of the front left damper 302*a*, into the first hydraulic line 332*a*, from the first hydraulic line 332*a* to the second hydraulic line 332*b* by passing through the front left bridge line 340*a* and the front left comfort valve 344*a*, and into the first rebound chamber 328*a* of the front left damper 302*a*. Thus, fluid can travel from the first compression chamber 326*a* to the first rebound chamber 328*a* of the front left damper 302*a* with the only restriction coming from the variable control valves 360, 364, if any. The second and third bi-directional pumps 310*b*, 310*c* are placed in a free-running condition in the first comfort operating mode (i.e., the second and third bi-directional pumps 310*b*, 310*c* are powered off, but still permit fluid flow through the second and third bi-directional pumps 310*b*, 310*c*) such that fluid flow is still permitted through the first and second longitudinal hydraulic lines 330*a*, 330*b*. In the example where the second and third bi-directional pumps 310*b*, 310*c* include impellers, the impellers of the second and third bi-directional pumps 310*b*, 310*c* are permitted to spin freely in the first comfort operating mode and have some inertia, which provides additional damping to pressure/flow disturbances in the suspension system 300. As such, in the first comfort operating mode, the dampers 302*a*-302*d* are effectively decoupled from one another for improved ride comfort.

Figure 11:
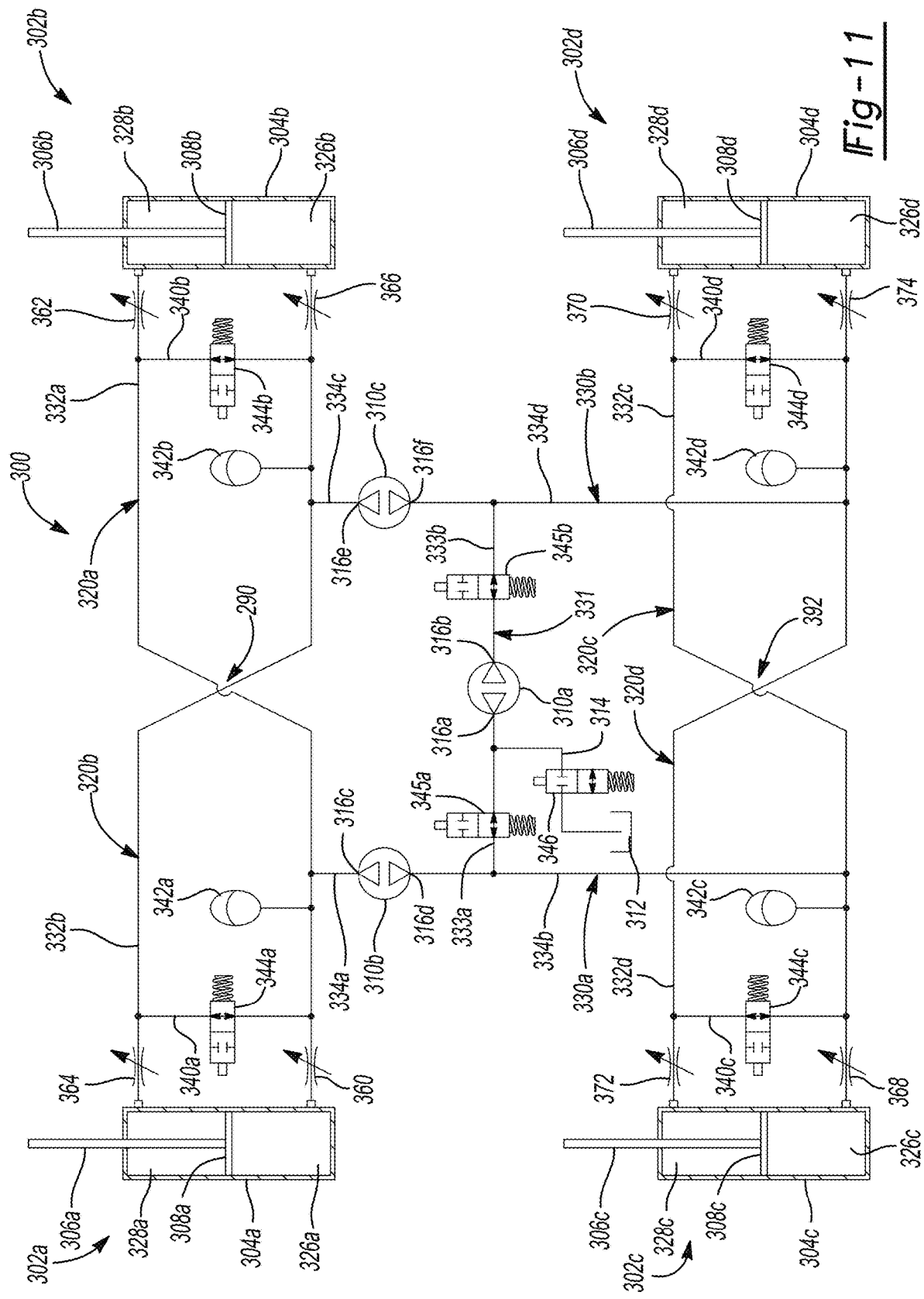
FIG. 11 is a schematic diagram illustrating the exemplary suspension system shown in FIG. 9 as it is operating in a second comfort mode.

FIG. 11 illustrates the suspension system 300 in a second comfort operating mode. The second comfort operating mode is similar to the first comfort operating mode, except that in the second comfort operating mode the first and second distribution line shut-off valves 345*a*, 345*b* are open such that hydraulic fluid can flow through the fluid distribution line 331. The controller 380 may activate the second comfort operating mode by opening the front left shut-off valve 344*a*, front right shut-off valve 344*b*, back left shut-off valve 344*c*, and back right shut-off valve 344*d*, and the first and second distribution line shut-off valves 345*a*, 345*b*, while closing the reservoir shut-off valve 346. In the second comfort operating mode, the first bi-directional pump 310*a* is also placed in a free-running condition (i.e., the first bi-directional pump 310*a* is powered off, but still permits fluid flow through the first bi-directional pump 310*a*). In the example where the first bi-directional pump 310*a* includes an impeller, the impeller of the first bi-directional pump 310a is permitted to spin freely in the second comfort operating mode and has some inertia, which provides additional damping to pressure/flow disturbances in the suspension system 300. Thus, in the second comfort operating mode, pressure/flow disturbances can flow from the first longitudinal hydraulic line 330a to the second longitudinal hydraulic line 330b or vice versa by passing through the fluid distribution line 331 and the first bi-directional pump 310a in addition to passing through the second and third bi-directional pumps 310b, 310c. This larger/expanded network of hydraulic lines/conduits with greater fluid volume, inertial resistance, and/or flow restriction can help attenuate pressure/flow disturbances at certain frequencies to reduce the response one impact event can have on other dampers 302a-302d in the suspension system 300 as a result of hydraulic coupling.

Figure 12:
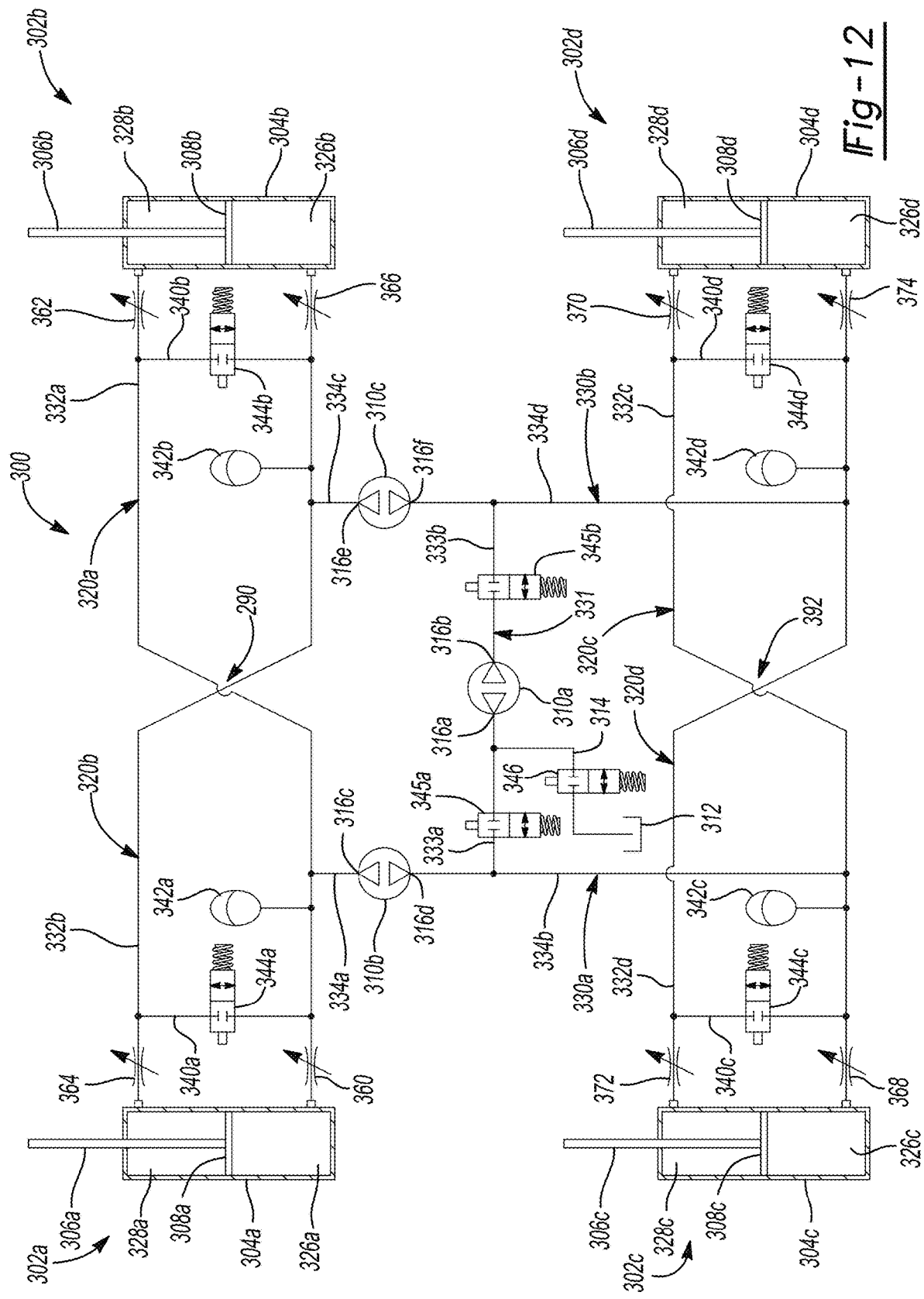
FIG. 12 is a schematic diagram illustrating the exemplary suspension system shown in FIG. 9 as it is operating in a passive roll control mode.

FIG. 12 illustrates the suspension system 300 in a passive roll control operating mode. The controller 380 activates the passive roll control operating mode by closing the front left shut-off valve 344a, front right shut-off valve 344b, back left shut-off valve 344c, back right shut-off valve 344d, the first and second distribution line shut-off valves 345a, 345b and the reservoir shut-off valve 346. The first bi-directional pump 310a is deactivated and the second and third bi-directional pumps 310b, 310c are powered off and are free running in the passive roll control operating mode such that hydraulic fluid in the first and second longitudinal hydraulic lines 330a, 330b can flow through the second and third bi-directional pumps 310b, 310c.

When the vehicle is placed in a left turn, the momentum of the sprung weight of the vehicle body 103 tends to make the vehicle lean right towards the outside of the turn, compressing the front right damper 302b and the back right damper 302d. When this occurs, fluid flows out from the second compression chamber 326b of the front right damper 302b and the fourth compression chamber 326d of the back right damper 302d into the second and fourth hydraulic lines 332b, 332d. As a result of the weight transfer to the right side of the vehicle, the front left damper 302a and back left damper 302c begin to extend, causing fluid to flow out of the first rebound chamber 328a of the front left damper 302a and the third rebound chamber 328c of the back left damper 302c into the second and fourth hydraulic lines 332b, 332d causing pressure in the second and fourth hydraulic lines 332b, 332d to increase even further, which increases the pressure in the second compression chamber 326b of the front right damper 302b and the fourth compression chamber 326d of the back right damper 302d making the front right damper 302b and the back right damper 302d more difficult to compress. This counteracts the momentum/roll moment of the sprung weight of the vehicle body 103 as it attempts to roll or lean to the right.

When the vehicle is placed in a right turn, the momentum of the sprung weight of the vehicle body 103 tends to make the vehicle lean left towards the outside of the turn, compressing the front left damper 302a and the back left damper 302c. When this occurs, fluid flows out from the first compression chamber 326a of the front left damper 302a and the third compression chamber 326c of the back left damper 302c into the first and third hydraulic lines 332a, 332c. As a result of the weight transfer to the left side of the vehicle, the front right damper 302b and back right damper 302d begin to extend, causing fluid to flow out of the second rebound chamber 328b of the front right damper 302b and the fourth rebound chamber 328d of the back right damper 302d into the first and third hydraulic lines 332a, 332c causing pressure in the first and third hydraulic lines 332a, 332c to increase even further, which increases the pressure in the first compression chamber 326a of the front left damper 302a and the third compression chamber 326c of the back left damper 302c making the front left damper 302a and the back left damper 302c more difficult to compress. This counteracts the momentum/roll moment of the sprung weight of the vehicle body 103 as it attempts to roll or lean to the left.

Figure 13:
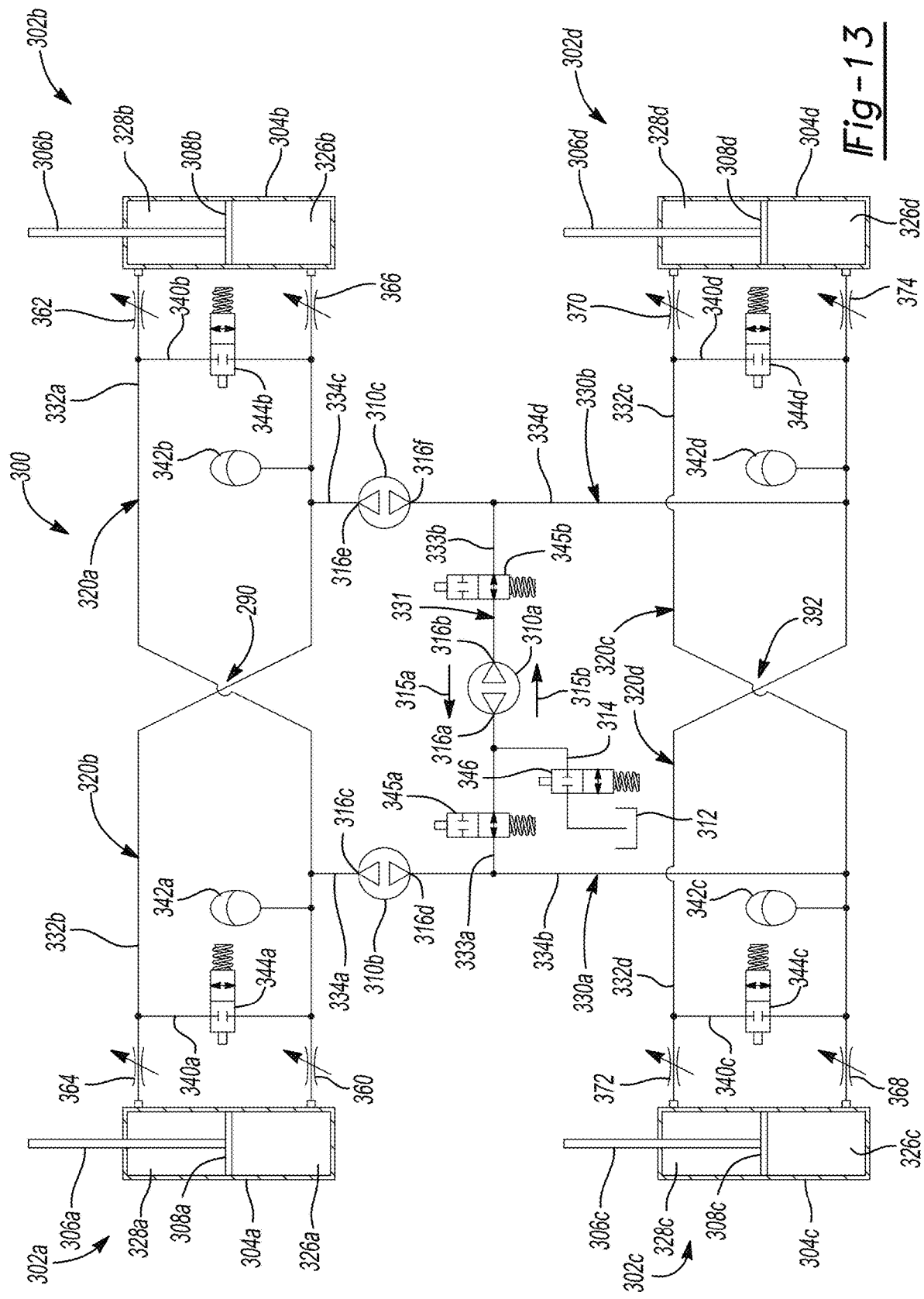
FIG. 13 is a schematic diagram illustrating the exemplary suspension system shown in FIG. 9 as it is operating in an active roll control mode.

FIG. 13 illustrates the suspension system 300 in an active roll control operating mode. When the vehicle is placed in a left turn, the momentum of the sprung weight of the vehicle body 103 tends to make the vehicle lean right towards the outside of the turn, compressing the front right damper 302b and the back right damper 302d. When this occurs, fluid flows out from the second compression chamber 326b of the front right damper 302b and the fourth compression chamber 326d of the back right damper 302d into the second and fourth hydraulic lines 332b, 332d. As a result of the weight transfer to the right side of the vehicle, the front left damper 302a and back left damper 302c begin to extend, causing fluid to flow out of the first rebound chamber 328a of the front left damper 302a and the third rebound chamber 328c of the back left damper 302c into the second and fourth hydraulic lines 332b, 332d. As this occurs, the controller 380 activates the active roll control operating mode by closing the front left shut-off valve 344a, front right shut-off valve 344b, back left shut-off valve 344c, back right shut-off valve 344d, and the reservoir shut-off valve 346, while opening the first and second distribution line shut-off valves 345a, 345b and activating the first bi-directional pump 310a to pump hydraulic fluid in the first direction 315a from the first distribution line segment 333a and therefore the first longitudinal hydraulic line 330a and into the second distribution line segment 333b and therefore the second longitudinal hydraulic line 330b.

In this example, the second port 316b is operating as an outlet port for the first bi-directional pump 310a and the first port 316a is operating as an inlet port for the first bi-directional pump 310a. Accordingly, the first bi-directional pump 310a draws in hydraulic fluid from the first distribution line segment 333a via the first port 316a and discharges hydraulic fluid into the second distribution line segment 333b via the second port 316b such that the first bi-directional pump 310a operates to increase fluid pressure in the second longitudinal hydraulic line 330b, which increases the pressure in the second hydraulic circuit 320b and therefore the second compression chamber 326b of the front right damper 302b and the fourth hydraulic circuit 320d and therefore the fourth compression chamber 326d of the back right damper 302d, the making the front right damper 302b and the back right damper 302d more difficult to compress. This counteracts the momentum/roll moment of the sprung weight of the vehicle body 103 as it attempts to roll or lean to the right during a left turn.

When the vehicle is placed in a right turn, the momentum of the sprung weight of the vehicle body 103 tends to make the vehicle lean left towards the outside of the turn, compressing the front left damper 302a and the back left damper 302c. When this occurs, fluid flows out from the first compression chamber 326a of the front left damper 302a and the third compression chamber 326c of the back left damper 302c into the first and third hydraulic lines 332a, 332c. As a result of the weight transfer to the left side of the vehicle, the front right damper 302b and back right damper 302d begin to extend, causing fluid to flow out of the second rebound chamber 328b of the front right damper 302b and the fourth rebound chamber 328d of the back right damper 302d into the first and third hydraulic lines 332a, 332c. As this occurs, the controller 380 activates the active roll control operating mode by closing the front left shut-off valve 344a, front right shut-off valve 344b, back left shut-off valve 344c, back right shut-off valve 344d, and the reservoir shut-off valve 346, while opening the first and second distribution line shut-off valves 345a, 345b and activating the first bi-directional pump 310a to pump hydraulic fluid in a second direction 315b from the second distribution line segment 333b and therefore the second longitudinal hydraulic line 330b and into the first distribution line segment 333a and therefore the first longitudinal hydraulic line 330a. In accordance with this example, the first port 316a is operating as an outlet port for the first bi-directional pump 310a and the second port 316b is operating as an inlet port for the first bi-directional pump 310a. Accordingly, the first bi-directional pump 310a draws in hydraulic fluid from the second distribution line segment 333b via the second port 316b and discharges hydraulic fluid into the first distribution line segment 333a via the first port 316a such that the first bi-directional pump 310a operates to increase fluid pressure in the first longitudinal hydraulic line 330a, which increases the pressure in the first hydraulic circuit 320a and therefore the first compression chamber 326a of the front left damper 302a and the third hydraulic circuit 320c and therefore the third compression chamber 326c of the back left damper 302c, making the front left damper 302a and the back left damper 302c more difficult to compress. This counteracts the momentum/roll moment of the sprung weight of the vehicle body 103 as it attempts to roll or lean to the left during a right turn.

The second and third bi-directional pumps 310b, 310c are powered off and are free running in the active roll control operating mode such that hydraulic fluid in the first and second longitudinal hydraulic lines 330a, 330b can flow through the second and third bi-directional pumps 310b, 310c.

Figure 14:
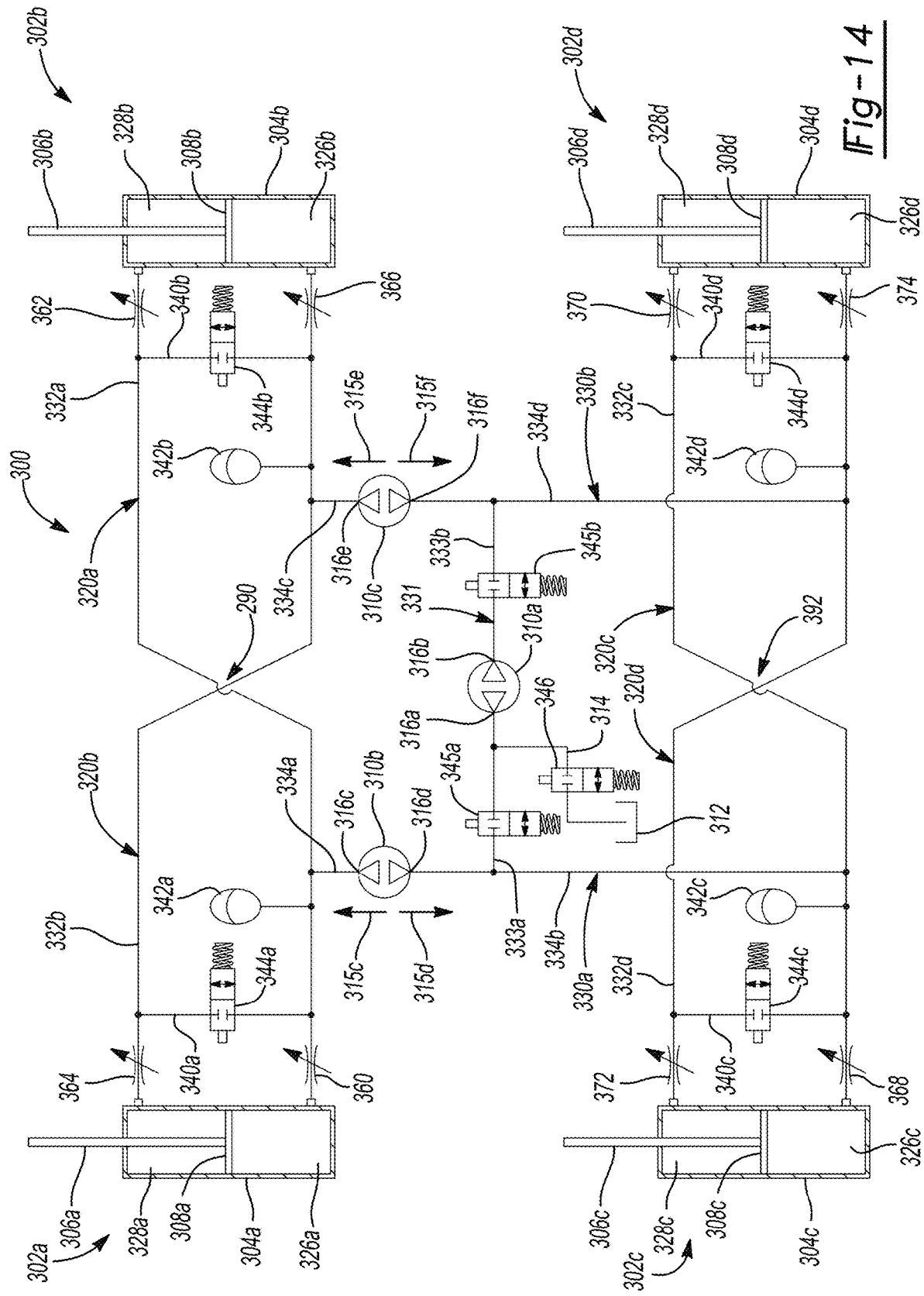
FIG. 14 is a schematic diagram illustrating the exemplary suspension system shown in FIG. 9 as it is operating in an active roll moment distribution control mode.

FIG. 14 illustrates the suspension system 300 in an active roll moment distribution control operating mode. In the roll moment distribution control operating mode, the controller 380 either actives the second and third bi-directional pumps 310b, 310c to pump hydraulic fluid towards the front axle in the third and fifth directions 315c, 315e to increase fluid pressure in the first and second hydraulic circuits 320a, 320b or actives the second and third bi-directional pumps 310b, 310c to pump hydraulic fluid towards the rear axle in the fourth and sixth directions 315d, 315f to increase fluid pressure in the third and fourth hydraulic circuits 320c, 320d. The suspension system 300 then makes use of the passive roll resistance described above, but at a higher static pressure in either the first and second hydraulic circuits 320a, 320b or the third and fourth hydraulic circuits 320c, 320d to counteract body roll during a turn. In the active roll moment distribution control operating mode, the controller 380 closes the front left shut-off valve 344a, front right shut-off valve 344b, back left shut-off valve 344c, back right shut-off valve 344d, the first and second distribution line shut-off valves 345a, 345b, and the reservoir shut-off valve 346, while activating the second and third bi-directional pumps 310b, 310c to pump hydraulic fluid in either the third and fifth directions 315c, 315e or in the fourth and sixth directions 315d, 315f. The first bi-directional pump 310a remains deactivated during the active roll moment distribution control operating mode.

When the controller 380 actives the second and third bi-directional pumps 310b, 310c to pump hydraulic fluid towards the front axle in the third and fifth directions 315c, 315e to increase fluid pressure in the first and second hydraulic circuits 320a, 320b, the third port 316c is operating as an outlet port for the second bi-directional pump 310b and the fourth port 316d is operating as an inlet port for the second bi-directional pump 310b. Similarly, the fifth port 316e is operating as an outlet port for the third bi-directional pump 310c and the sixth port 316f is operating as an inlet port for the third bi-directional pump 310c. Accordingly, the second bi-directional pump 310b draws in hydraulic fluid from the second hydraulic line segment 334b via the fourth port 316d and discharges hydraulic fluid into the first hydraulic line segment 334a via the third port 316c and the third bi-directional pump 310c draws in hydraulic fluid from the fourth hydraulic line segment 334d via the sixth port 316f and discharges hydraulic fluid into the third hydraulic line segment 334c via the fifth port 316e. As such, the second and third bi-directional pumps 310b, 310c operate to increase fluid pressure in the first and second hydraulic lines 332a, 332b, which increases the passive roll stiffness across the front axle to counteract the momentum of the sprung weight of the vehicle body 103 as it attempts to roll/lean left or right during a turn.

When the controller 380 actives the second and third bi-directional pumps 310b, 310c to pump hydraulic fluid towards the rear axle in the fourth and sixth directions 315d, 315f to increase fluid pressure in the third and fourth hydraulic circuits 320c, 320d, the third port 316c is operating as an inlet port for the second bi-directional pump 310b and the fourth port 316d is operating as an outlet port for the second bi-directional pump 310b. Similarly, the fifth port 316e is operating as an inlet port for the third bi-directional pump 310c and the sixth port 316f is operating as an outlet port for the third bi-directional pump 310c. Accordingly, the second bi-directional pump 310b draws in hydraulic fluid from the first hydraulic line segment 334a via the third port 316c and discharges hydraulic fluid into the second hydraulic line segment 334b via the fourth port 316d and the third bi-directional pump 310c draws in hydraulic fluid from the third hydraulic line segment 334c via the fifth port 316e and discharges hydraulic fluid into the fourth hydraulic line segment 334d via the sixth port 316f. As such, the second and third bi-directional pumps 310b, 310c operate to increase fluid pressure in the third and fourth hydraulic lines 332c, 332d, which increases the passive roll stiffness across the rear axle to counteract the momentum of the sprung weight of the vehicle body 103 as it attempts to roll/lean left or right during a turn.

Figure 15:
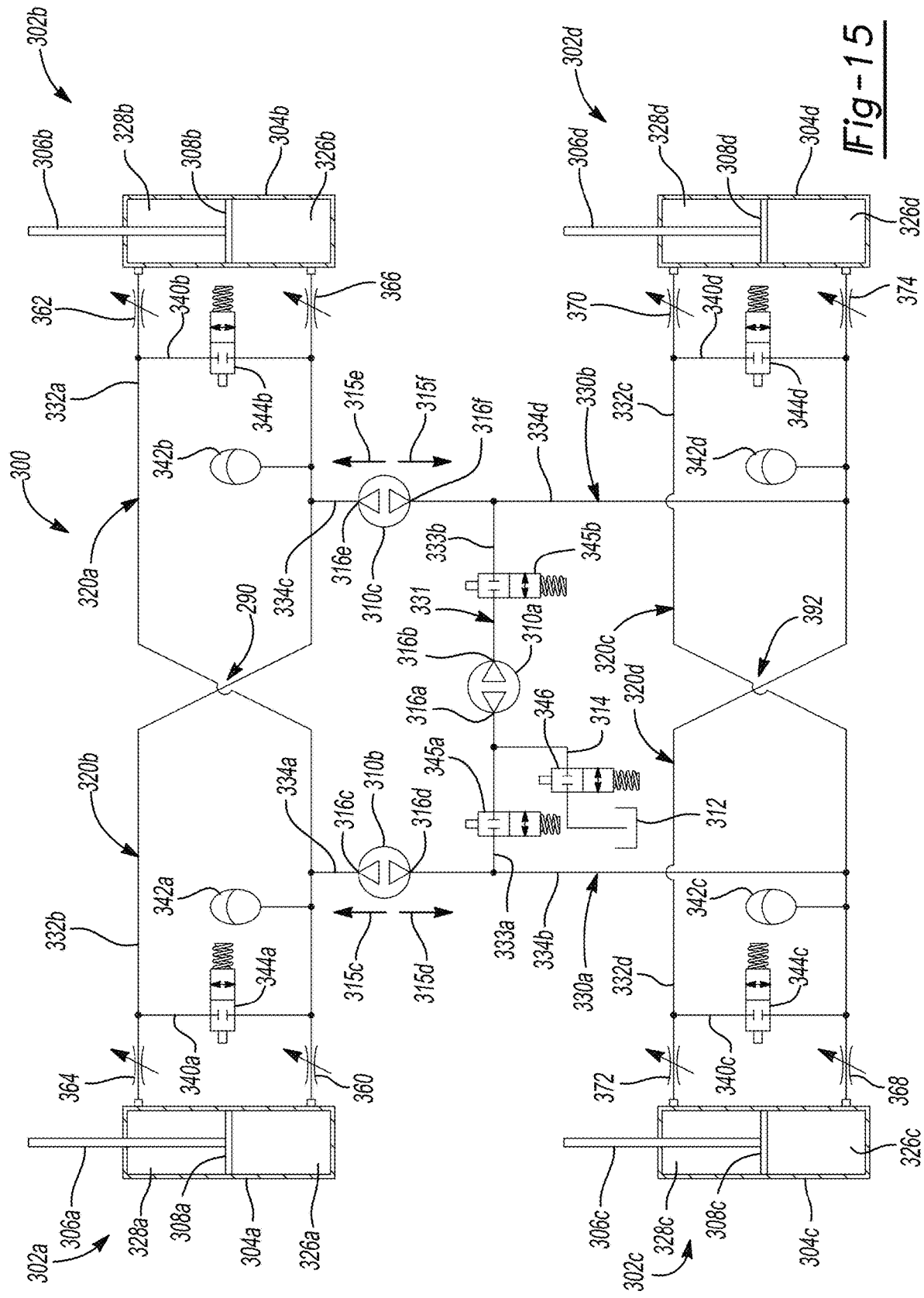
FIG. 15 is a schematic diagram illustrating the exemplary suspension system shown in FIG. 9 as it is operating in an active pitch control mode.

FIG. 15 illustrates the suspension system 300 in a pitch control operating mode. During braking, the momentum of the sprung weight of the vehicle body 103 tends to make the vehicle body 103 pitch or dive forward, compressing the front left damper 302a and the front right damper 302b. When this occurs, fluid flows out from the first compression chamber 326a of the front left damper 302a into the first hydraulic line 332a and out from the second compression chamber 326b of the front right damper 302b into the second hydraulic line 332b. As a result of the weight transfer to the front of the vehicle, the back left damper 302c and back right damper 302d begin to extend, causing fluid to flow out of the third rebound chamber 328c of the back left damper 302c into the third hydraulic line 332c and out of the fourth rebound chamber 328d of the back right damper 302d into the fourth hydraulic line 332d. As this occurs, the controller 180 activates the pitch control operating mode by closing the front left shut-off valve 344a, front right shut-off valve 344b, back left shut-off valve 344c, back right shut-off valve 344d, the first and second distribution line shut-off valves 345a, 345b, and the reservoir shut-off valve 346, while activating the second and third bi-directional pumps 310b, 310c to pump hydraulic fluid in either the third and fifth directions 315c, 315e to increase the pressure in the first and second hydraulic lines 332a, 332b. The first bi-directional pump 310a remains deactivated during the active pitch control operating mode.

When the controller 380 actives the second and third bi-directional pumps 310b, 310c to pump hydraulic fluid towards the front axle in the third and fifth directions 315c, 315e to increase fluid pressure in the first and second hydraulic circuits 320a, 320b, the third port 316c is operating as an outlet port for the second bi-directional pump 310b and the fourth port 316d is operating as an inlet port for the second bi-directional pump 310b. Similarly, the fifth port 316e is operating as an outlet port for the third bi-directional pump 310c and the sixth port 316f is operating as an inlet port for the third bi-directional pump 310c. Accordingly, the second bi-directional pump 310b draws in hydraulic fluid from the second hydraulic line segment 334b via the fourth port 316d and discharges hydraulic fluid into the first hydraulic line segment 334a via the third port 316c and the third bi-directional pump 310c draws in hydraulic fluid from the fourth hydraulic line segment 334d via the sixth port 316f and discharges hydraulic fluid into the third hydraulic line segment 334c via the fifth port 316e. As such, the second and third bi-directional pumps 310b, 310c operate to increase fluid pressure in the first and second hydraulic lines 332a, 332b, which increases the pressure in the first compression chamber 126a of the front left damper 102a and the second compression chamber 126b of the front right damper 102b making the front left damper 102a and the front right damper 102d more difficult to compress. This counteracts the momentum of the sprung weight of the vehicle body 103 as it attempts to pitch or dive forward during braking.

During acceleration, the momentum of the sprung weight of the vehicle body 103 tends to make the vehicle body 103 pitch or squat rearward (i.e., aft), compressing the back left damper 302c and the back right damper 302d. When this occurs, fluid flows out from the third compression chamber 326c of the back left damper 302c into the third hydraulic line 332c and out from the fourth compression chamber 326d of the back right damper 302d into the fourth hydraulic line 332d. As a result of the weight transfer to the back/rear of the vehicle, the front left damper 302a and front right damper 302b begin to extend, causing fluid to flow out of the first rebound chamber 328a of the front left damper 302a into the second hydraulic line 332b and out of the second rebound chamber 328b of the front right damper 302b into the first hydraulic line 332a. As this occurs, the controller 380 activates the active pitch control operating mode by closing the front left shut-off valve 344a, front right shut-off valve 344b, back left shut-off valve 344c, back right shut-off valve 344d, the first and second distribution line shut-off valves 345a, 345b, and the reservoir shut-off valve 346, while activating the second and third bi-directional pumps 310b, 310c to pump hydraulic fluid in the fourth and sixth directions 315d, 315f to increase the pressure in the third and fourth hydraulic lines 332c, 332d.

When the controller 380 actives the second and third bi-directional pumps 310b, 310c to pump hydraulic fluid towards the rear axle in the fourth and sixth directions 315d, 315f to increase fluid pressure in the third and fourth hydraulic circuits 320c, 320d, the third port 316c is operating as an inlet port for the second bi-directional pump 310b and the fourth port 316d is operating as an outlet port for the second bi-directional pump 310b. Similarly, the fifth port 316e is operating as an inlet port for the third bi-directional pump 310c and the sixth port 316f is operating as an outlet port for the third bi-directional pump 310c. Accordingly, the second bi-directional pump 310b draws in hydraulic fluid from the first hydraulic line segment 334a via the third port 316c and discharges hydraulic fluid into the second hydraulic line segment 334b via the fourth port 316d and the third bi-directional pump 310c draws in hydraulic fluid from the third hydraulic line segment 334c via the fifth port 316e and discharges hydraulic fluid into the fourth hydraulic line segment 334d via the sixth port 316f. As such, the second and third bi-directional pumps 310b, 310c operate to increase fluid pressure in the third and fourth hydraulic lines 332c, 332d, which increases the pressure in the third compression chamber 326c of the back left damper 302c and the fourth compression chamber 326d of the back right damper 302d making the back left damper 302c and the back right damper 302d more difficult to compress. This counteracts the momentum of the sprung weight of the vehicle body 103 as it attempts to pitch or squat rearward (i.e., aft) during acceleration.

Figure 16:
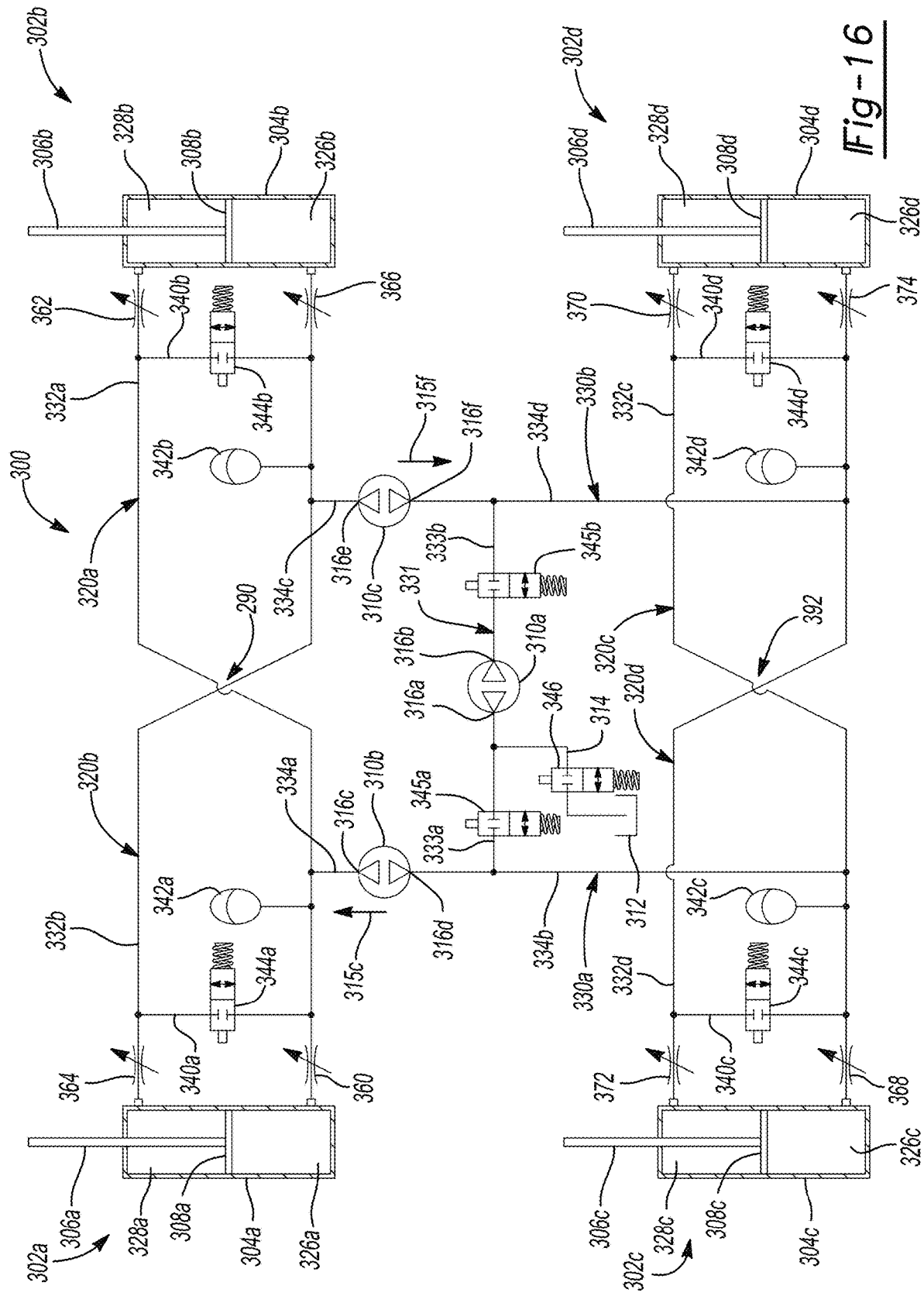
FIG. 16 is a schematic diagram illustrating the exemplary suspension system shown in FIG. 9 as it is operating in an active warp control mode.

FIG. 16 illustrates the suspension system 300 in a warp control operating mode, which permits greater or lesser amounts of articulation of the suspension system 300 during on-road or off-road maneuvers, for example. The controller 380 activates the warp control operating mode by closing the front left shut-off valve 344a, front right shut-off valve 344b, back left shut-off valve 344c, back right shut-off valve 344d, the first and second distribution line shut-off valves 345a, 345b, and the reservoir shut-off valve 346, while activating the second and third bi-directional pumps 310b, 310c to pump hydraulic fluid in opposite directions (e.g., in the third and sixth directions 315c, 315f as shown in FIG. 16 or alternatively in the fourth and fifth directions 315d, 315e). The first bi-directional pump 310a remains deactivated during the warp control operating mode.

In the illustrated example, the controller 380 has activated the second bi-directional pump 310b to pump hydraulic fluid in the third direction 315c from the second hydraulic line segment 334b and therefore from the third hydraulic circuit 320c and into the first hydraulic line segment 334a and therefore the first hydraulic circuit 320a, while activating the third bi-directional pump 310c to pump hydraulic fluid from the third hydraulic line segment 334c and therefore from the second hydraulic circuit 320b and into the fourth hydraulic line segment 334d and therefore into the fourth hydraulic circuit 320d. In this example, the third port 316c is operating as an outlet port for the second bi-directional pump 310b and the fourth port 316d is operating as an inlet port for the second bi-directional pump 310b. By contrast, the fifth port 316e is operating as an inlet port for the third bi-directional pump 310c and the sixth port 316f is operating as an outlet port for the third bi-directional pump 310c. Accordingly, the second bi-directional pump 310b draws in hydraulic fluid from the second hydraulic line segment 334b via the fourth port 316d and discharges hydraulic fluid into the first hydraulic line segment 334a via the third port 316c and the third bi-directional pump 310c draws in hydraulic fluid from the third hydraulic line segment 334c via the fifth port 316e and discharges hydraulic fluid into the fourth hydraulic line segment 334d via the sixth port 316f. As a result, the second and third bi-directional pumps 310b, 310c operate to increase fluid pressure in the first and fourth hydraulic lines 332a, 332d, which increases the pressure in the first compression chamber 326a of the front left damper 302a and the fourth compression chamber 326d of the back right damper 302d making the front left damper 302a and the back right damper 302d more difficult to compress.

In another example, the controller 380 may activate the second bi-directional pump 310b to pump hydraulic fluid in the fourth direction 315d from the first hydraulic line segment 334a and therefore from the first hydraulic circuit 320a and into the second hydraulic line segment 334b and therefore the third hydraulic circuit 320c, while activating the third bi-directional pump 310c in the fifth direction 315e to pump hydraulic fluid from the four hydraulic line segment 334d and therefore from the fourth hydraulic circuit 320d and into the third hydraulic line segment 334c and therefore into the second hydraulic circuit 320b. In this example, the third port 316c is operating as an inlet port for the second bi-directional pump 310b and the fourth port 316d is operating as an outlet port for the second bi-directional pump 310b. By contrast, the fifth port 316e is operating as an outlet port for the third bi-directional pump 310c and the sixth port 316f is operating as an inlet port for the third bi-directional pump 310c. Accordingly, the second bi-directional pump 310b draws in hydraulic fluid from the first hydraulic line segment 334a via the third port 316c and discharges hydraulic fluid into the second hydraulic line segment 334b via the fourth port 316d and the third bi-directional pump 310c draws in hydraulic fluid from the fourth hydraulic line segment 334d via the sixth port 316f and discharges hydraulic fluid into the third hydraulic line segment 334c via the fifth port 316e. As a result, the second and third bi-directional pumps 310b, 310c operate to increase fluid pressure in the second and third hydraulic lines 332b, 332c, which increases the pressure in the second compression chamber 326b of the front right damper 302b and the third compression chamber 326c of the back left damper 302c making the front right damper 302b and the back left damper 302c more difficult to compress.

Figure 17:
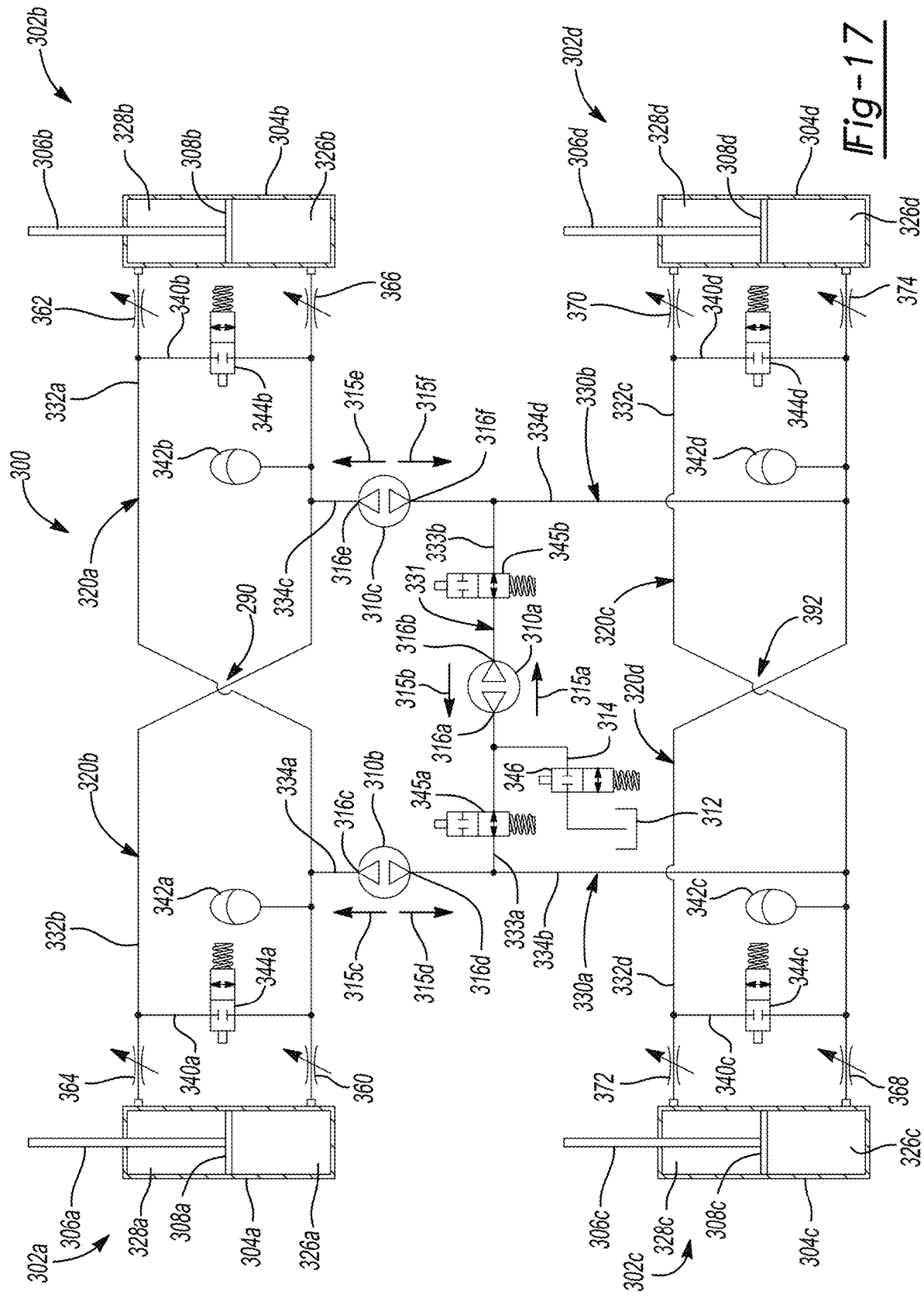
FIG. 17 is a schematic diagram illustrating the exemplary suspension system shown in FIG. 9 as it is operating in a fully adaptive active control mode.

FIG. 17 illustrates the suspension system 300 in a fully adaptive active operating mode, which provides dynamic active roll, pitch, warp, and roll moment distribution control. The controller 380 activates the fully adaptive active operating mode by closing the front left shut-off valve 344a, front right shut-off valve 344b, back left shut-off valve 344c, back right shut-off valve 344d, and the reservoir shut-off valve 346. The controller 380 may then activate the second and third bi-directional pumps 310b, 310c to pump hydraulic fluid in the same direction to pump hydraulic fluid in the third and fifth directions 315c, 315e towards the front axle or in the fourth and sixth directions 315d, 315f towards the rear axle to change the pitch stiffness of the suspension system 300 and/or change the roll moment distribution of the front dampers 302a, 302b compared to the rear dampers 302c, 302d. Alternatively, the controller 380 may then activate the second and third bi-directional pumps 310b, 310c to pump hydraulic fluid in opposite directions (e.g., in the third and sixth directions 315c, 315f or in the fourth and fifth directions 315d, 315e). At the same time or at different times, the controller 380 may open and close the first and second distribution line shut-off valves 345a, 345b and may activate the first bi-directional pump 310a to pump hydraulic fluid through the fluid distribution line 331 in the first or second direction 315a, 315b to provide active roll control, as discussed above, which may or may not operate in conjunction with the active pitch control and roll moment distribution control provided by the operation of the second and third bi-directional pumps 310b, 310c.

Figure 18:
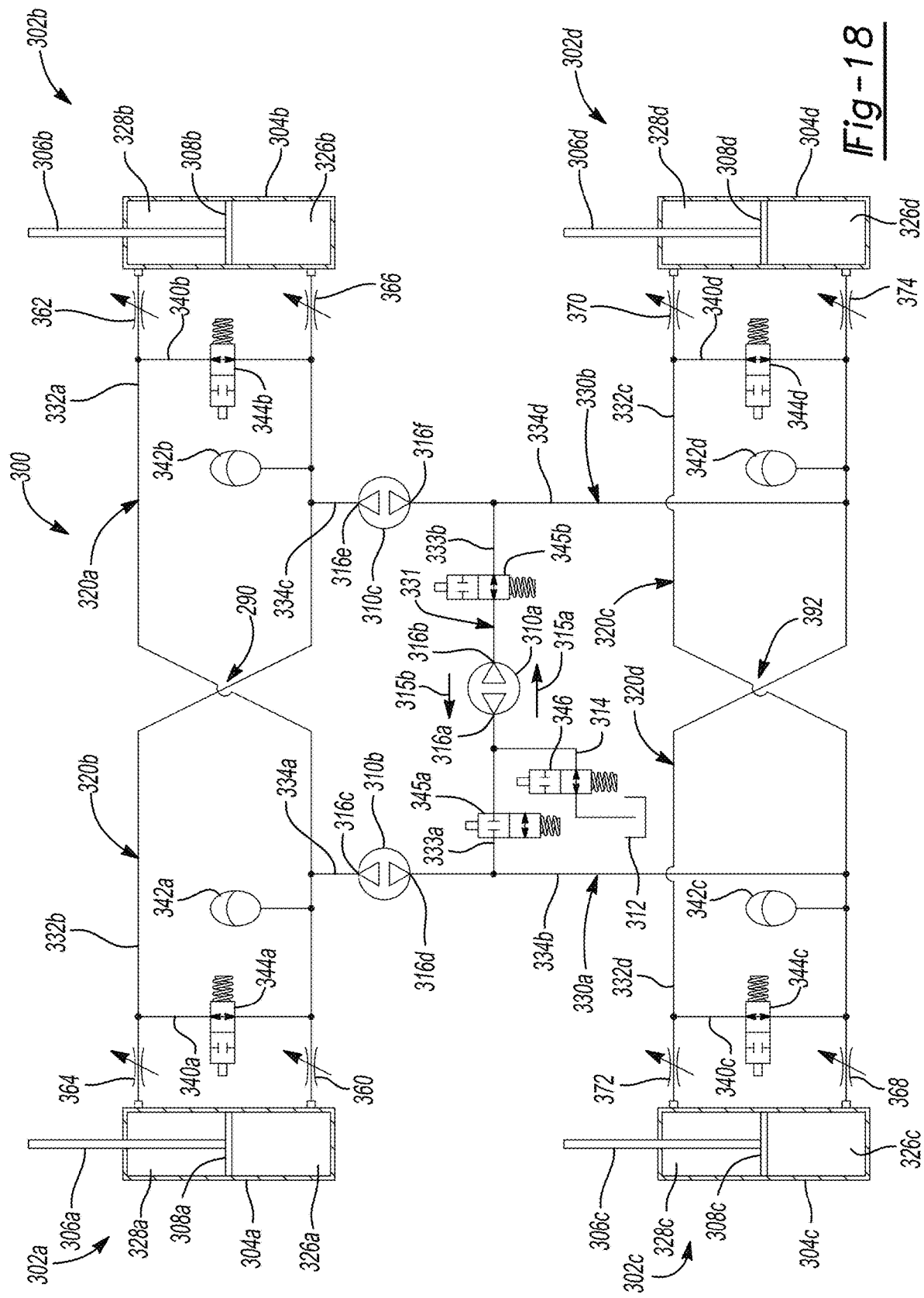
FIG. 18 is a schematic diagram illustrating the exemplary suspension system shown in FIG. 9 as it is operating in a pressure control mode.

FIG. 18 illustrates the suspension system 300 when the controller 380 initiates a pressure control operating mode. To raise fluid pressure in the hydraulic circuits 320a, 320b, 320c, 320d of the suspension system 300, the controller 380 activates the first bi-directional pump 310a to pump hydraulic fluid in the first direction 315a from the hydraulic fluid reservoir 312 via the reservoir line 314 and into the second longitudinal hydraulic line 330b via the second distribution line segment 333b. In this example, the front left shut-off valve 344a, front right shut-off valve 344b, back left shut-off valve 344c, back right shut-off valve 344d are all open and the first distribution line shut-off valve 345a is closed, and both the second distribution line shut-off valve 345b and the reservoir shut-off valve 346 are open. The first port 316a is operating as the inlet port of the first bi-directional pump 310a and the second port 316b is operating as the outlet port of the first bi-directional pump 310a. Accordingly, the first bi-directional pump 310a draws in hydraulic fluid from the first distribution line segment 333a via the first port 316a and discharges hydraulic fluid into the second distribution line segment 333b via the second port 316b. Because the front left shut-off valve 344a, front right shut-off valve 344b, back left shut-off valve 344c, back right shut-off valve 344d are all open, the static pressure in all of the hydraulic circuits 320a, 320b, 320c, 320d is increased.

To reduce fluid pressure in the hydraulic circuits 320a, 320b, 320c, 320d of the suspension system 300, the controller 380 activates the first bi-directional pump 310a to pump hydraulic fluid in the second direction 315b from the second longitudinal hydraulic line 330b via the second distribution line segment 333b and into the hydraulic fluid reservoir 312 via the reservoir line 314. Again, the front left shut-off valve 344a, front right shut-off valve 344b, back left shut-off valve 344c, back right shut-off valve 344d are all open and the first distribution line shut-off valve 345a is closed, and both the second distribution line shut-off valve 345b and the reservoir shut-off valve 346 are open. The second port 316b is operating as the inlet port of the first bi-directional pump 310a and the first port 316a is operating as the outlet port of the first bi-directional pump 310a. Accordingly, the first bi-directional pump 310a draws in hydraulic fluid from the second distribution line segment 333b via the second port 316b and discharges hydraulic fluid into the first distribution line segment 333a via the first port 316a. Because the front left shut-off valve 344a, front right shut-off valve 344b, back left shut-off valve 344c, back right shut-off valve 344d are all open, the static pressure in all of the hydraulic circuits 320a, 320b, 320c, 320d is reduced.

Many other modifications and variations of the present disclosure are possible in light of the above teachings and may be practiced otherwise than as specifically described while within the scope of the appended claims.

What is claimed is:

1. A suspension system, comprising:
   a front left damper including a first compression chamber and a first rebound chamber;
   a front right damper including a second compression chamber and a second rebound chamber;
   a back left damper including a third compression chamber and a third rebound chamber;
   a back right damper including a fourth compression chamber and a fourth rebound chamber;
   a first hydraulic circuit that fluidly connects said first compression chamber of said front left damper and said second rebound chamber of said front right damper;
   a second hydraulic circuit that fluidly connects said first rebound chamber of said front left damper and said second compression chamber of said front right damper;

a third hydraulic circuit that fluidly connects said third compression chamber of said back left damper and said fourth rebound chamber of said back right damper;

a fourth hydraulic circuit that fluidly connects said third rebound chamber of said back left damper and said fourth compression chamber of said back right damper;

a first longitudinal hydraulic line extending between and fluidly connecting said first and third hydraulic circuits;

a second longitudinal hydraulic line extending between and fluidly connecting said second and fourth hydraulic circuits;

a fluid distribution line that extends between and fluidly connects said first longitudinal hydraulic line and said second longitudinal hydraulic line;

a single bi-directional pump that is arranged along and fluidly connected to said fluid distribution line, said single bi-directional pump having a first operating mode for pumping hydraulic fluid in a first direction through said fluid distribution line to said second longitudinal hydraulic line and a second operating mode for pumping hydraulic fluid in a second direction through said fluid distribution line to said first longitudinal hydraulic line;

a controller electrically connected to said single bi-directional pump and programmed to activate said first operating mode or said second operating mode of said single bi-directional pump;

a first distribution line shut-off valve positioned in said fluid distribution line between said single bi-directional pump and said first longitudinal hydraulic line;

a second distribution line shut-off valve positioned in said fluid distribution line between said single bi-directional pump and said second longitudinal hydraulic line;

a front left bridge line that extends between and fluidly connects said first and second hydraulic circuits;

a front left shut-off valve that is positioned in said front left bridge line;

a front right bridge line that extends between and fluidly connects said first and second hydraulic circuits;

a front right shut-off valve that is positioned in said front right bridge line;

a back left bridge line that extends between and fluidly connects said third and fourth hydraulic circuits;

a back left shut-off valve that is positioned in said back left bridge line;

a back right bridge line that extends between and fluidly connects said third and fourth hydraulic circuits; and a back right shut-off valve that is positioned in said back right bridge line, wherein said first distribution line shut-off valve, said second distribution line shut-off valve, said front left shut-off valve, said front right shut-off valve, said back left shut-off valve, and said back right shut-off valve are two position electro-mechanical valves, each having a fully open position and a fully closed position, wherein said controller is programmed to initiate:

a first active roll control operating mode where each of said front left shut-off valve, said front right shut-off valve, said back left shut-off valve, and said back right shut-off valve are in said fully closed position, said first and second distribution line shut-off valves are in said fully open position, and said single bi-directional pump is activated in said first operating mode to pump hydraulic fluid through said fluid distribution line in said first direction from said first longitudinal hydraulic line and to said second longitudinal hydraulic line increase fluid pressure in said second and fourth hydraulic circuits and increase compression stiffness in said front right damper and said back right damper; and a second active roll control operating mode where each of said front left shut-off valve, said front right shut-off valve, said back left shut-off valve, and said back right shut-off valve are in said fully closed position, said first and second distribution line shut-off valves are in said fully open position, and said single bi-directional pump is activated in said second operating mode to pump hydraulic fluid through said fluid distribution line in said second direction from said second longitudinal hydraulic line and to said first longitudinal hydraulic line increase fluid pressure in said first and third hydraulic circuits and increase compression stiffness in said front left damper and said back left damper.

2. The suspension system as set forth in claim 1, wherein said controller is programmed to initiate:

a passive roll control operating mode where each of said front left shut-off valve, said front right shut-off valve, said back left shut-off valve, and said back right shut-off valve are in said fully closed position, said first and second distribution line shut-off valves are in said fully closed position, and said single bi-directional pump is deactivated.

3. The suspension system as set forth in claim 1, wherein said controller is programmed to initiate:

a first comfort operating mode where each of said front left shut-off valve, said front right shut-off valve, said back left shut-off valve, and said back right shut-off valve are in said fully open position, said first and second distribution line shut-off valves are in said fully closed position, and said single bi-directional pump is deactivated; and a second comfort operating mode where each of said front left shut-off valve, said front right shut-off valve, said back left shut-off valve, and said back right shut-off valve are in said fully open position, said first and second distribution line shut-off valves are in said fully open position, and said single bi-directional pump is deactivated and in a free-running condition.

4. A suspension system, comprising:

a front left damper including a first compression chamber and a first rebound chamber;

a front right damper including a second compression chamber and a second rebound chamber;

a back left damper including a third compression chamber and a third rebound chamber;

a back right damper including a fourth compression chamber and a fourth rebound chamber;

a first hydraulic circuit that fluidly connects said first compression chamber of said front left damper and said second rebound chamber of said front right damper;

a second hydraulic circuit that fluidly connects said first rebound chamber of said front left damper and said second compression chamber of said front right damper;

a third hydraulic circuit that fluidly connects said third compression chamber of said back left damper and said fourth rebound chamber of said back right damper;

a fourth hydraulic circuit that fluidly connects said third rebound chamber of said back left damper and said fourth compression chamber of said back right damper;

a first longitudinal hydraulic line extending between and fluidly connecting said first and third hydraulic circuits;

a second longitudinal hydraulic line extending between and fluidly connecting said second and fourth hydraulic circuits;

a fluid distribution line that extends between and fluidly connects said first longitudinal hydraulic line and said second longitudinal hydraulic line;

a single bi-directional pump that is arranged along and fluidly connected to said fluid distribution line, said single bi-directional pump having a first operating mode for pumping hydraulic fluid in a first direction through said fluid distribution line to said second longitudinal hydraulic line and a second operating mode for pumping hydraulic fluid in a second direction through said fluid distribution line to said first longitudinal hydraulic line;

a controller electrically connected to said single bi-directional pump and programmed to activate said first operating mode or said second operating mode of said single bi-directional pump;

a distribution line shut-off valve positioned in said fluid distribution line between said single bi-directional pump and one of said first longitudinal hydraulic line and said second longitudinal hydraulic line;

a front left bridge line that extends between and fluidly connects said first and second hydraulic circuits;

a front left shut-off valve that is positioned in said front left bridge line;

a front right bridge line that extends between and fluidly connects said first and second hydraulic circuits;

a front right shut-off valve that is positioned in said front right bridge line;

a back left bridge line that extends between and fluidly connects said third and fourth hydraulic circuits;

a back left shut-off valve that is positioned in said back left bridge line;

a back right bridge line that extends between and fluidly connects said third and fourth hydraulic circuits; and a back right shut-off valve that is positioned in said back right bridge line, wherein said distribution line shut-off valve, said front right shut-off valve, said back left shut-off valve, and said back right shut-off valve are two position electro-mechanical valves, each having a fully open position and a fully closed position, wherein said controller is programmed to initiate:

a first active roll control operating mode where each of said front left shut-off valve, said front right shut-off valve, said back left shut-off valve, and said back right shut-off valve are in said fully closed position, said distribution line shut-off valve is in said fully open position, and said single bi-directional pump is activated in said first operating mode to pump hydraulic fluid through said fluid distribution line in said first direction from said first longitudinal hydraulic line and to said second longitudinal hydraulic line increase fluid pressure in said second and fourth hydraulic circuits and increase compression stiffness in said front right damper and said back right damper; and a second active roll control operating mode where each of said front left shut-off valve, said front right shut-off valve, said back left shut-off valve, and said back right shut-off valve are in said fully closed position, said distribution line shut-off valve is in said fully open position, and said single bi-directional pump is activated in said second operating mode to pump hydraulic fluid through said fluid distribution line in said second direction from said second longitudinal hydraulic line and to said first longitudinal hydraulic line increase fluid pressure in said first and third hydraulic circuits and increase compression stiffness in said front left damper and said back left damper.

* * * * *